United States Patent
Simandl et al.

(10) Patent No.: US 8,337,626 B2
(45) Date of Patent: Dec. 25, 2012

(54) METHOD FOR REMOVAL OF BERYLLIUM CONTAMINATION FROM AN ARTICLE

(75) Inventors: Ronald F. Simandl, Knoxville, TN (US); Scott M. Hollenbeck, Knoxville, TN (US)

(73) Assignee: Babcock & Wilcox Technical Services Y-12, LLC, Oak Ridge, TN (US)

( * ) Notice: Subject to any disclaimer, the term of this patent is extended or adjusted under 35 U.S.C. 154(b) by 0 days.

(21) Appl. No.: 13/407,156

(22) Filed: Feb. 28, 2012

(65) Prior Publication Data

US 2012/0152282 A1  Jun. 21, 2012

Related U.S. Application Data

(63) Continuation of application No. 11/946,234, filed on Nov. 28, 2007, now abandoned, which is a continuation-in-part of application No. 11/485,020, filed on Jul. 12, 2006, now abandoned, application No. 13/407,156, which is a continuation of application No. 11/485,020, filed on Jul. 12, 2006, now abandoned.

(51) Int. Cl.
*B08B 7/00* (2006.01)
*B32B 5/02* (2006.01)
*B05D 3/02* (2006.01)

(52) U.S. Cl. .............. 134/6; 442/78; 427/372.2

(58) Field of Classification Search ........ 134/6; 442/78, 442/327
See application file for complete search history.

(56) References Cited

U.S. PATENT DOCUMENTS

| | | |
|---|---|---|
| 2,955,962 A | 10/1960 | Engdahl |
| 3,334,006 A | 8/1967 | Koller |
| 3,965,519 A | 6/1976 | Hermann |
| 4,251,364 A | 2/1981 | Carr et al. |
| 4,260,485 A | 4/1981 | Carr et al. |
| 4,595,622 A | 6/1986 | Schaefer |
| 4,767,556 A | 8/1988 | Childers et al. |
| 4,804,577 A | 2/1989 | Hazelton et al. |
| 4,908,052 A | 3/1990 | Largman et al. |
| 5,071,699 A | 12/1991 | Pappas et al. |
| 5,198,292 A | 3/1993 | Lerner et al. |
| 5,207,838 A | 5/1993 | Googin et al. |
| 5,241,042 A | 8/1993 | Petrea et al. |
| 5,421,281 A | 6/1995 | Beyrouty |
| 5,439,628 A | 8/1995 | Huang |
| 5,559,185 A | 9/1996 | Abe et al. |
| 5,698,475 A | 12/1997 | Vlasblom |
| 6,083,854 A | 7/2000 | Bogdanski et al. |
| 6,544,594 B2 | 4/2003 | Linford et al. |

(Continued)

FOREIGN PATENT DOCUMENTS

JP   10204234 A   8/1998

(Continued)

*Primary Examiner* — Lynda Salvatore
(74) *Attorney, Agent, or Firm* — Luedeka Neely Group, P.C.

(57) ABSTRACT

A method of removal of beryllium contamination from an article is disclosed. The method typically involves dissolving polyisobutylene in a solvent such as hexane to form a tackifier solution, soaking the substrate in the tackifier to produce a preform, and then drying the preform to produce the cleaning medium. The cleaning media are typically used dry, without any liquid cleaning agent to rub the surface of the article and remove the beryllium contamination below a non-detect level. In some embodiments no detectible residue is transferred from the cleaning wipe to the article as a result of the cleaning process.

11 Claims, 17 Drawing Sheets

U.S. PATENT DOCUMENTS

| | | |
|---|---|---|
| 6,554,881 B1 | 4/2003 | Healey |
| 6,746,522 B2 | 6/2004 | Trippe et al. |
| 6,746,974 B1 | 6/2004 | Reiterer et al. |
| 7,179,382 B2 | 2/2007 | Hiltzik et al. |
| 2002/0050016 A1* | 5/2002 | Willman et al. ......... 15/104.002 |
| 2003/0049407 A1 | 3/2003 | Kacher et al. |
| 2004/0127649 A1 | 7/2004 | Arjunan et al. |
| 2005/0210601 A1 | 9/2005 | Strang et al. |
| 2005/0244480 A1 | 11/2005 | Koenig et al. |
| 2007/0107156 A1 | 5/2007 | Willman et al. |

FOREIGN PATENT DOCUMENTS

| | | |
|---|---|---|
| WO | WO 95/18883 A1 | 7/1995 |
| WO | WO 98/09724 A1 | 3/1998 |

* cited by examiner

METHOD FOR REMOVAL OF BERYLLIUM CONTAMINATION FROM AN ARTICLE

CROSS REFERENCES TO RELATED APPLICATIONS

This patent application claims priority from and is a Continuation of U.S. patent application Ser. No. 11/946,234 filed Nov. 28, 2007, now abandoned, entitled "CLEANING MEDIUM FOR REMOVING CONTAMINATION AND METHOD OF MAKING." U.S. patent application Ser. No. 11/946,234 is a Continuation-in-Part of, U.S. patent application Ser. No. 11/485,020 filed 12 Jul. 2006, now abandoned, entitled: "Cleaning Wipe for Removing Contamination from an Article and Method of Making." Patent application Ser. Nos. 11/946,234 and 11/485,020, now abandoned, are incorporated by reference in their entirety herein.

GOVERNMENT RIGHTS

The U.S. Government has rights to this invention pursuant to contract number DE-AC05-00OR22800 between the U.S. Department of Energy and Babcock & Wilcox Technical Services Y-12, LLC.

FIELD

The Disclosure relates to the field of cleaning devices for removing contamination from a surface. More particularly this Disclosure relates to the use of a cleaning wipe for removal of beryllium contamination to a non-detection level without leaving a residue from the cleaning wipe.

BACKGROUND

Many industrial and commercial processes and some consumer activities benefit from thoroughly cleaning the surface of an article prior to application of the article for its intended end use or prior to clearing the article for further processing or disposal. Examples of such applications are cleaning articles prior to bonding them or applying a surface finish, removing hazardous surface contamination from articles prior to their exposure to humans or other living organisms, and polishing surfaces for beauty or clarity. Over the years many forms of paper, fabric, and film utility wipes have been developed to assist in such cleaning processes. Some utility media incorporate a tackifier to assist in removing contamination from a surface being cleaned and in holding any minute solid particles or trace liquids on the cleaning medium as it swipes the surface of the article being cleaned. Many tackifiers are inherently sticky substances, and cleaning an article using a medium that incorporates such sticky substances may be difficult if the tackifier in a cleaning medium causes the cleaning medium to stick to the article being cleaned. To overcome this problem, some utility media add a lubricant or a release agent or similar chemical to the medium in order to decrease friction between the cleaning medium and the article being cleaned. However, such additives may reduce the overall cleaning efficiency of the cleaning medium and in some cases leave an unwanted residue on the article being cleaned.

Among the difficulties facing manufacturers of any consumer or industrial product is that as manufacturing technologies improve, manufacturing tolerances and safety standards become increasingly tighter and cleanliness requirements become more demanding. For example, it is not uncommon for contamination limits to be set at fractions of micrograms per hundred square centimeters. One difficulty in achieving these levels is that as cleaning products and processes become more efficient in removing original contamination from an article, the cleaning products and processes may themselves contribute to the final contamination level of the article because of residues of chemicals used in the medium that are left on the cleaned article. What are needed therefore are improved cleaning media that entrap and remove harmful contamination from the surface of an article to be cleaned without leaving residue from materials incorporated into the cleaning medium. Also, because these media are typically discarded after a single use or a small number of uses, what are further needed are inexpensive and simple methods for manufacturing high performance cleaning media.

There are also many industrial, commercial and consumer applications for filtration of contaminants from a gaseous fluid flow. Examples are furnace filters, clean-room filters, glove-box filters, and breathing mask filters. In many of these applications it is desirable to not only prevent the passage of contamination beyond the filtration point but to also entrap the contamination in a manner that diminishes the inadvertent release of filtered contaminants during operation and during maintenance when the filter is replaced. In some applications it may be desirable to electrostatically attract contaminants in a gaseous fluid flow stream without employing an electronic static generator. While various filtration systems have been developed to address some of these needs, there are many applications that may benefit from an inexpensive filter having improved filtration properties combined with reduced resistance to fluid flow.

SUMMARY

The present disclosure provides in one embodiment a cleaning medium that includes a substrate having a bulk mass and a front surface having fibers. Polyisobutylene is disposed on the fibers. A substantial portion of the polyisobutylene has a molecular weight greater than approximately 30,000 and the relative weight ratio between the polyisobutylene and the fibers having polyisobutylene disposed thereon is between approximately 1 to 10 wt % polyisobutylene to approximately 90 to 99 wt % fibers. A further embodiment provides a cleaning medium that has a substrate having a plurality of fibers each having a surface. Polyisobutylene is disposed on the surface of the fibers to form treated fibers having a treated thickness. The cleaning medium may include droplets disposed on the treated fibers, and the droplets typically have a length that is between approximately one and five times the treated thickness of the treated fibers and the droplets generally have a width that is between approximately 110% and 150% of the treated thickness of the treated fibers.

Also provided is a method of making a cleaning medium. The method includes a step of dissolving polyisobutylene having a molecular weight over 30,000 in a solvent that includes an alkane, an isoparaffin, an aliphatic compound, a cycloaliphatic compound, or a dipentene to make a tackifier solution. The method further includes a step of applying the tackifier solution to a substrate to produce a preform, and a step of drying the preform to form the cleaning medium.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1A:
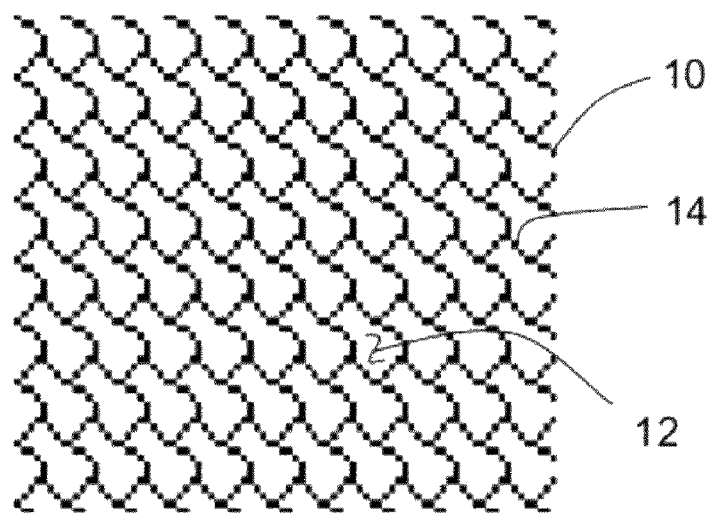
FIGS. 1A, 2A, and 3A are schematic top views of substrates for use in a cleaning medium.
Figure 1B:
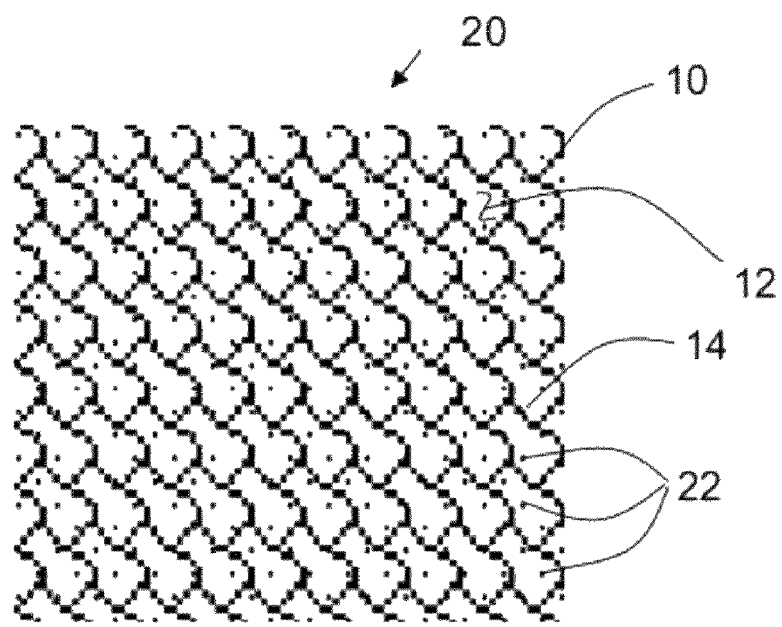
FIGS. 1B, 2B, and 3B are schematic top views of cleaning media incorporating polyisobutylene disposed adjacent to the surface of the substrate of the cleaning media.

Described herein are various embodiments of a cleaning medium and methods of making cleaning media. As used herein the term "cleaning medium" and the corresponding plural tense "cleaning media" refer to cleaning implements, polishers, and filters. Cleaning implements include cleaning wipes, dust rags, feather dusters, dust mops, brooms, brushes, rollers and sponges and similar devices. Fluid filters include air filters, process gas filters, liquid filters, cigarette filters, membranes, and similar devices as typically used in gaseous or liquid fluid streams. Polishers include buffing wheels and polishing cloths. The cleaning media described herein are typically used to capture particles and aerosols, removing them from physical surfaces or fluid streams. FIG. 1A is a schematic representation of the top view of a substrate 10 for use in a cleaning medium. The substrate 10 has a front surface 12. The substrate 10 is a fabric that includes random loop micro fibers 14. In some embodiments the micro fibers 14 are 20 μm-diameter cellulose fibers. FIG. 1B is a schematic top view representation of a cleaning medium 20. The cleaning medium 20 includes a substrate 10 and also includes polyisobutylene 22 disposed adjacent to the front surface 12 of the substrate 10.

As used herein, polyisobutylene (or "PIB") refers to any polymer of isobutylene. It is to be understood that the term "front surface" is used herein to refer to a surface of a substrate at which polyisobutylene is disposed, and the term is not intended to connote an orientation of the substrate. The term "disposed at" as used herein refers to a configuration where the polyisobutylene is either (a) disposed adjacent to the front surface or (b) is disposed within the substrate (e.g., among fibers comprising the substrate) at locations just below the front surface or (c) is disposed both adjacent to the front surface and within the substrate at locations just below the front surface. For example, referring to FIG. 1A, polyisobutylene 22 may be disposed adjacent to the front surface 12 by either (a) being disposed on the front surface 12 of substrate 10 or (b) being disposed within the substrate 10 at locations just below the front surface 12 or (c) by being disposed both on the front surface 12 and within the substrate at locations just below the front surface 12. In some embodiments polyisobutylene is substantially uniformly distributed within the fibers of the substrate. For example, referring to FIG. 1A, polyisobutylene 22 may be substantially uniformly distributed within the random loop micro fibers 14 of the substrate 10.

In some particular embodiments the distribution of the polyisobutylene 22 is substantially uniform across the geometric plane established by the front surface 12. It is to be understood that the random loop micro fibers 14 in FIGS. 1A and 1B are stylistically depicted in a specific geometric pattern but in practice the orientation and layout of the random loop micro fibers 14 may vary from this depiction. Furthermore, it is to be understood that the polyisobutylene 22 in FIG. 1B is stylistically depicted as discrete deposits but in practice depositions may vary in morphology, ranging from discrete deposits to substantially uniform films.

Figure 2A:
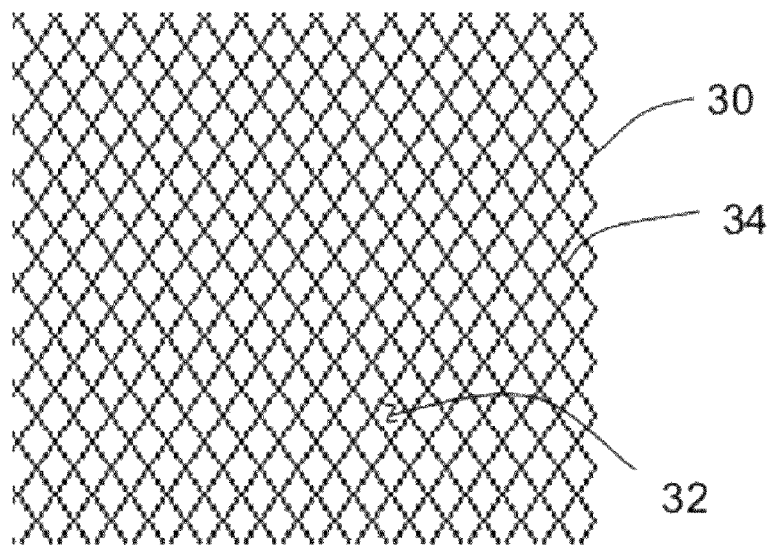
Figure 2B:
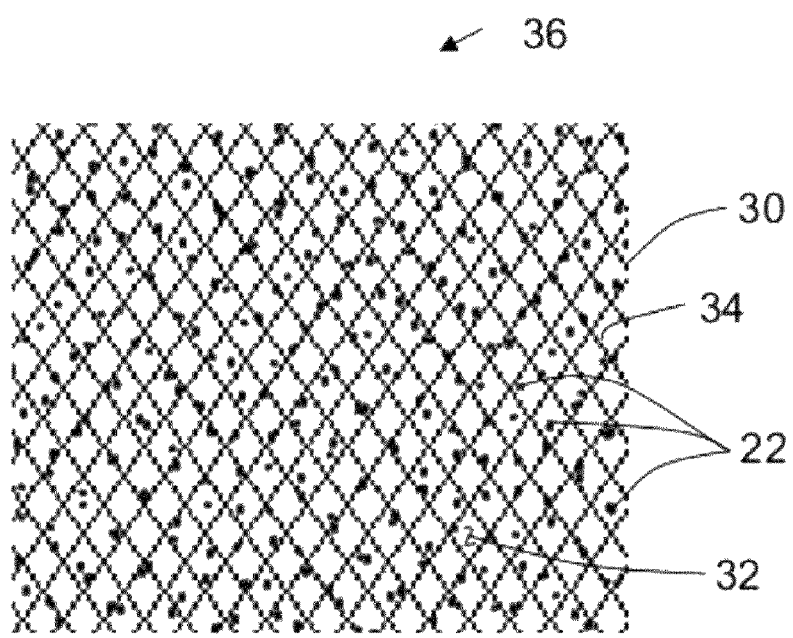

FIG. 2A is a schematic representation of the top view of a substrate 30 for use in a cleaning medium. The substrate 30 has a front surface 32. The substrate 30 is a cheesecloth fabric that includes woven cotton fibers 34. In some embodiments the woven cotton fibers 34 are 50 μm-diameter cellulose fibers that are spaced ~50 μm apart. Cheesecloth with fibers spaced more than about five hundred μm apart is referred to herein as open-weave cheesecloth. FIG. 2B is a schematic top view representation of a cleaning medium 36. The cleaning medium 36 includes substrate 30 and also includes polyisobutylene 22 disposed adjacent to the front surface 32 of the substrate 30. In some particular embodiments polyisobutylene (e.g., 22) is substantially uniformly distributed within the fibers (e.g., 34) of the substrate (e.g., 30). In some particular embodiments the distribution of the polyisobutylene 22 is substantially uniform across the geometric plane established by the front surface 32. It is to be understood that the woven cotton fibers 34 in FIGS. 2A and 2B are stylistically depicted in a specific geometric pattern but in practice the orientation and layout of the woven cotton fibers 34 may vary from this depiction. Furthermore, it is to be understood that in practice the polyisobutylene 22 in FIG. 2B is stylistically depicted as discrete deposits but in practice depositions may vary in morphology, ranging from discrete deposits to substantially uniform films. The polyisobutylene 22 may include small droplets disposed on a surface of the fibers (e.g., 34) of the substrate 30. In some embodiments the small droplets may circumscribe the fibers (e.g., 34) of the substrate 30.

Figure 3A:
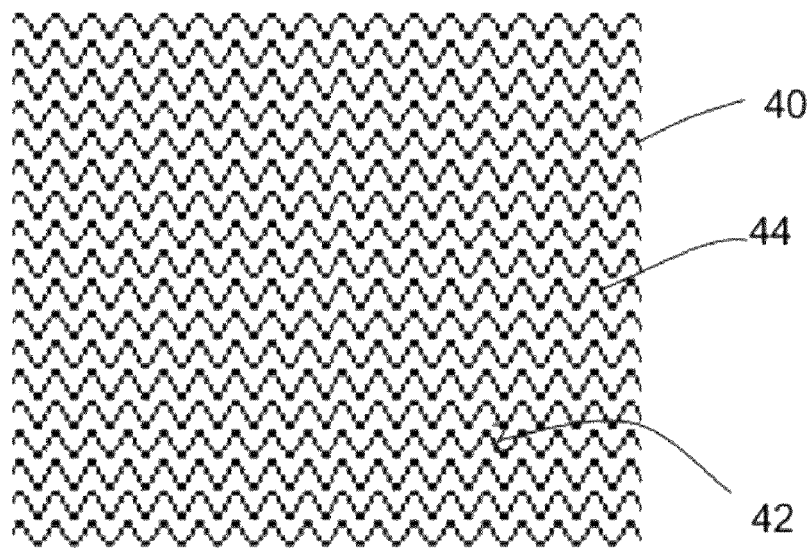
Figure 3B:
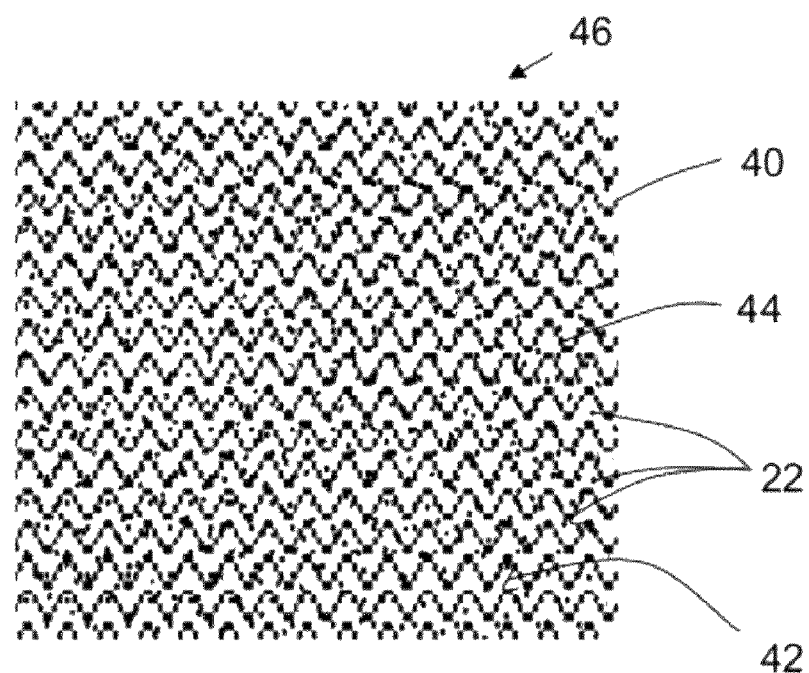

FIG. 3A is a schematic representation of the top view of a substrate 40 for use in a cleaning medium. The substrate 40 has a front surface 42. The substrate 40 is a hydro-entangled micro fiber cloth that includes densely packed cellulose and polyester fibers 44. In some embodiments the cellulose and polyester fibers 44 are approximately 20 μm in diameter. FIG. 3B is a schematic top view representation of a cleaning medium 46. The cleaning medium 46 includes substrate 40 and also includes polyisobutylene 22 disposed adjacent to the front surface 42 of the substrate 40. In some embodiments polyisobutylene (e.g., 22) is substantially uniformly distributed within the fibers (e.g., 44) of the substrate (e.g., 40). In particular embodiments the distribution of the polyisobutylene 22 is substantially uniform across the geometric plane established by the front surface 42. It is to be understood that the cellulose and polyester fibers 44 in FIGS. 3A and 3B are stylistically depicted in a specific geometric pattern but in practice the orientation and layout of the cellulose and polyester fibers 44 may vary from this depiction. Furthermore, it is to be understood that in practice the polyisobutylene 22 in FIG. 3B is stylistically depicted as discrete deposits but in practice depositions may vary in morphology, ranging from discrete deposits to substantially uniform films.

Figure 4A:
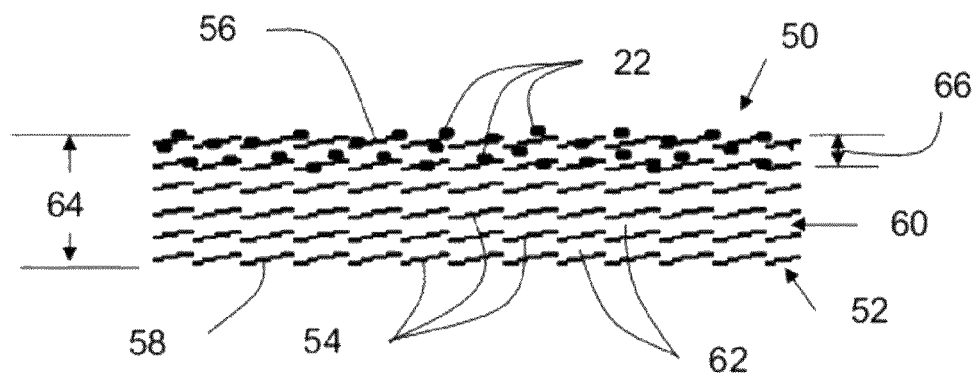
FIGS. 4A, 5A, 6, and 7A are schematic side views of cleaning media incorporating polyisobutylene disposed adjacent to the surface of the substrate of the cleaning media.

FIG. 4A depicts a schematic side view of cleaning medium 50. The cleaning medium 50 includes a substrate 52 made of fibers 54. The fibers 54 may be random loop micro fibers (e.g., 14 in FIGS. 1A and 1B), or woven cotton fibers (e.g., 34 in FIGS. 2A and 2B), or cellulose and polyester fibers (e.g., 44 in FIGS. 3A and 3B) or other fibers. Substrate 52 has a front surface 56 and an opposing back surface 58 and a bulk mass 60 between the front surface 56 and the back surface 58. The bulk mass 60 includes the fibers 54 and interstitial spaces 62 between fibers 54. The interstitial spaces 62 are an example of a plurality of voids in a bulk mass (e.g., 60). The cleaning medium 50 includes polyisobutylene 22 disposed adjacent to the front surface 56 of the substrate 52. The polyisobutylene 22 may be deposited adjacent to the front surface 56 of the substrate 52 by spraying, rolling, brushing, dipping, or using other manufacturing techniques. The substrate 52 is an example of a porous substrate. The overall thickness 64 of substrate 52 is typically between 100 μm and a 10 mm. The maximum value for thickness 64 is generally limited, if at all, by design parameters such as the desired mechanical flexure of substrate 52 that are not related to the cleaning effectiveness of the front surface 56. In the configuration depicted in FIG. 4A, the polyisobutylene 22 is disposed within the substrate 52 (i.e., among the fibers 54), at locations at the front surface 56 and just below the front surface 56 to a depth 66 that is generally less than about 20 percent of the thickness 64 of the substrate 52.

Figure 4B:
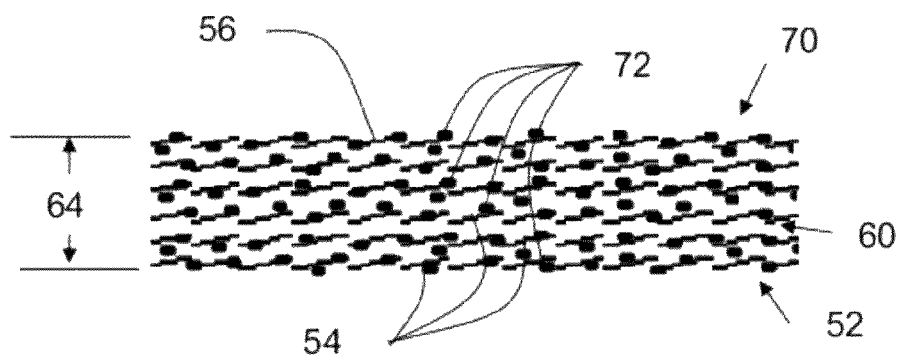
FIGS. 4B, 7B, and 7C are schematic side views of cleaning media incorporating polyisobutylene distributed through the bulk mass of the cleaning media.

FIG. 4B depicts a schematic side view of cleaning medium 70. The cleaning medium 70 includes the substrate 52 made of fibers 54 used in the cleaning medium 50 of FIG. 4A. In the embodiment of FIG. 4B the cleaning medium 70 includes polyisobutylene 72 that is disposed adjacent to the front surface 56 of the substrate 52 and the polyisobutylene 72 is further distributed substantially uniformly throughout the bulk mass 60 of the substrate 52.

Figure 5A:
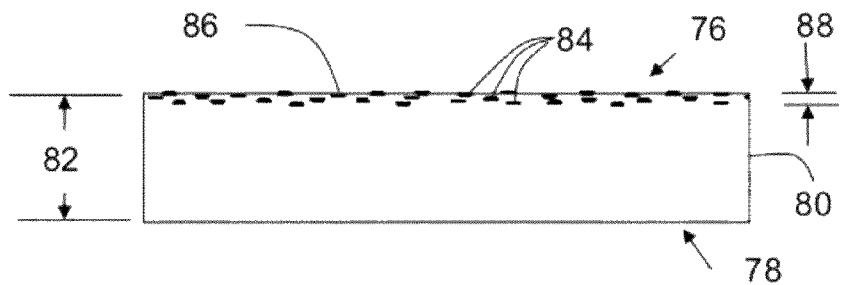

FIG. 5A depicts a schematic side view of cleaning medium 76. The cleaning medium 76 includes a substrate 78 made of a micro porous sheet 80, an example of a porous substrate. Substrate 78 may have a thickness 82 ranging from less than a millimeter to several centimeters or more. In some particular embodiments the thickness 82 is about half a millimeter. The maximum value for thickness 82 is limited, if at all, by design parameters such as the desired mechanical flexure of substrate 78 that are not related to the cleaning effectiveness of the front surface 86 of cleaning medium 76. In the embodiment of FIG. 5A the cleaning medium 76 includes polyisobutylene 84 that is disposed adjacent to the front surface 86 of the substrate 78. Substrate 78 is micro porous (having voids much smaller than the interstitial spaces 62 of substrate 52 in FIG. 4A), and the depth 88 of penetration of polyisobutylene 84 from front surface 86 is in this embodiment about five percent of the thickness 82 of substrate 78. A range of up to five percent (referenced to the thickness 82 of the substrate) penetration of the polyisobutylene (e.g., 84) is a configuration where polyisobutylene is disposed adjacent to the front surface (e.g. 86) of the substrate (e.g., 78), provided that at least some of the polyisobutylene (e.g., 84) is disposed below the front surface (e.g., 86) of the substrate (e.g., 78).

Figure 5B:
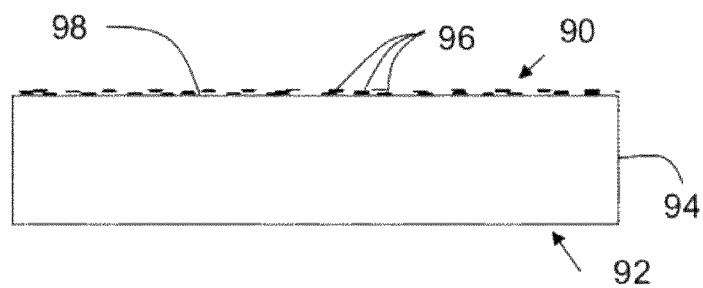
FIG. 5B is a schematic side view of a cleaning media medium incorporating polyisobutylene disposed on the front surface of the substrate of the cleaning medium.

FIG. 5B depicts a schematic side view of cleaning medium 90. The cleaning medium 90 includes a substrate 92 made of a substantially impervious material 94 such as metal or plastic. In the embodiment of FIG. 5B, the cleaning medium 90 includes polyisobutylene 96 that is disposed on the front surface 98 of the substrate 92. In this embodiment there is substantially no penetration of polyisobutylene 96 below the front surface 98 of the substrate 92. A configuration where polyisobutylene is disposed on the front surface (e.g., 98) of the substrate (e.g., 92) is a configuration where polyisobutylene is disposed adjacent to the front surface (e.g. 98) of the substrate (e.g., 92).

FIGS. 6, 7A, 7B, and 7C depict schematic side views of cleaning media made in various configurations from foam materials. Such foam materials may include, but are not limited to, foams made from polyethylene, polyurethane, polyvinyl chloride, and similar materials. Cleaning media depicted in FIGS. 6, 7A, 7B, and 7C have top views analogous to top views of cleaning media depicted in FIGS. 1B, 2B, and 3B.

Figure 6:
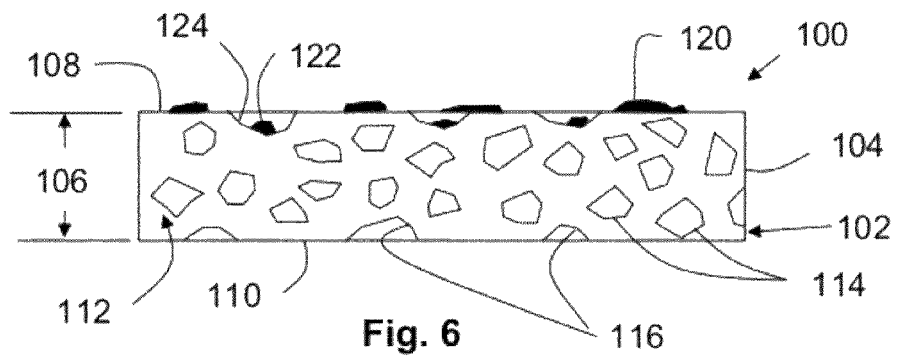

FIG. 6 depicts a schematic side view of cleaning medium 100. The cleaning medium 100 includes a substrate 102 made of closed cell foam 104, a further example of a porous substrate. Substrate 102 may have a thickness 106 ranging from about a millimeter to several centimeters or so. In some particular embodiments the thickness 106 is about half a millimeter. The maximum value for thickness 106 is limited, if at all, by design parameters such as the desired mechanical flexure of substrate 102 that are not related to the cleaning effectiveness of the front surface 108 of the cleaning medium 100. Substrate 102 has a back surface 110 opposing the front surface 108 and a bulk mass 112 between the front surface 108 and the back surface 110. Closed cell foam 104 includes cells 114 that are substantially unopened to an exterior surface and includes cells 116 that are open to an exterior surface (e.g., open to the back surface 110 for the closed cells 116 specifically identified in FIG. 6). The cells 114 and 116 are an example of a plurality of voids in a bulk mass (e.g., 112).

In the embodiment of FIG. 6 the cleaning medium 100 includes polyisobutylene 120 that is disposed on the front surface 108 of the substrate 102 and polyisobutylene 122 that is disposed in a cell 124 that is open to front surface 108. In view of the pathway from the cell 124 to the front surface 108, the polyisobutylene 122 is considered to be disposed on the front surface 108. The polyisobutylene 120 and the polyisobutylene 122 are polyisobutylene that is disposed adjacent to the front surface (e.g., 108) of the substrate (e.g., 102).

Figure 7A:
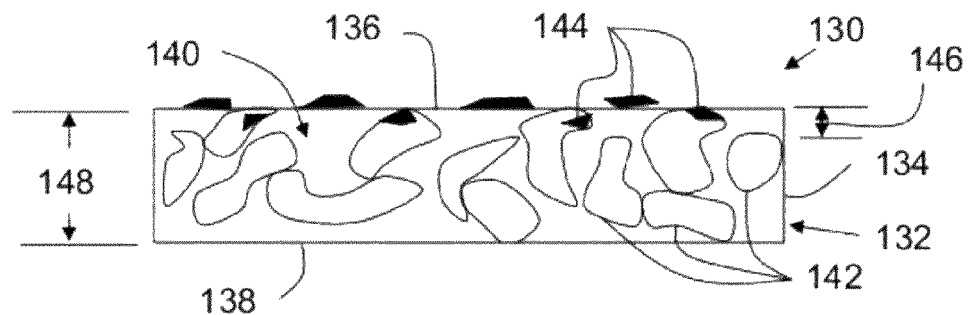

FIG. 7A depicts a schematic side view of cleaning medium 130. The cleaning medium 130 includes a substrate 132 made of open cell foam 134, providing another example of a porous substrate. Substrate 132 has a front surface 136 and an opposing back surface 138 and a bulk mass 140 between the front surface 136 and the back surface 138. The open cell foam 134 includes a plurality of cells 142, and substantially all of the cells 142 in open cell foam 134 have an open inter-cellular pathway to an exterior surface (e.g., to front surface 136 or to back surface 138). The cells 142 are an example of a plurality of voids in a bulk mass (e.g., 140). In embodiments where, as shown in FIG. 7A, polyisobutylene 144 is disposed adjacent to the front surface 136 of the substrate 52 in a configuration in which the polyisobutylene 144 is disposed both within the substrate (e.g., within cells 142) and on the surface (e.g. on surface 136), the polyisobutylene 22 is typically disposed below the front surface (e.g., 136) to a depth (e.g., 146) that is generally less than about 20 percent of the thickness (e.g., 148) of the substrate (e.g., 132).

Figure 7B:
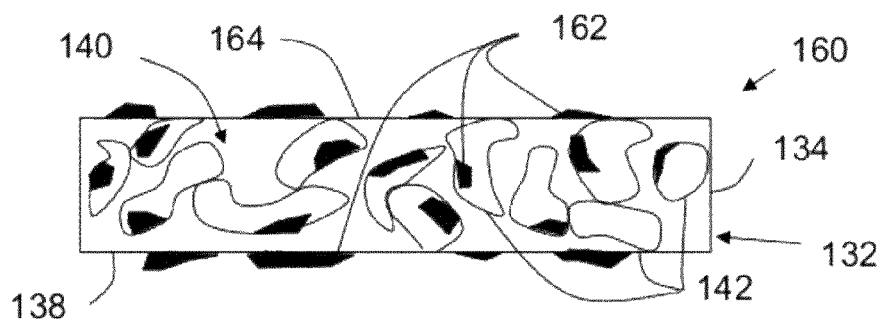

FIG. 7B depicts a schematic side view of cleaning medium 160. The cleaning medium 160 includes the substrate 132 used in the cleaning medium 130 of FIG. 7A. In the embodiment of FIG. 7B the cleaning medium 160 includes polyisobutylene 162 that is adjacent to the front surface 164 of the substrate 132 and adjacent to the opposing back surface 138 and the polyisobutylene 162 is further distributed substantially uniformly through the bulk mass 140 of the substrate 132.

Figure 7C:
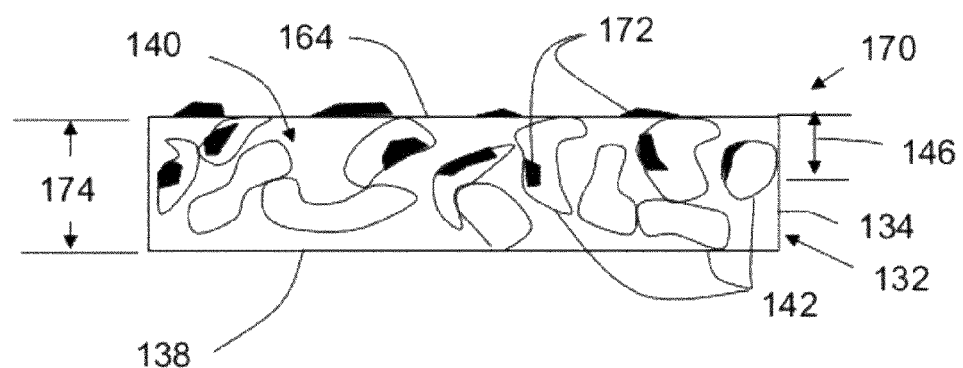

FIG. 7C depicts a schematic side view of cleaning medium 170. The cleaning medium 170 includes the substrate 132 used in the cleaning medium 130 of FIG. 7A and cleaning medium 160 of FIG. 7B. In the embodiment of FIG. 7C the cleaning medium 170 includes polyisobutylene 172 that is disposed adjacent to the front surface 164 of the substrate 132 and the polyisobutylene 162 is further distributed substantially uniformly through a depth 146 of the bulk mass 140 of the substrate 132. Depth 146 represents about one half the thickness 174 of the substrate 132. In various embodiments polyisobutylene (e.g., 170) may be disposed through the depth (e.g., 164) of the substrate (e.g., 132) of a cleaning medium (e.g., 170) that range from less than one percent of the thickness (e.g., 174) to one hundred percent of the thickness (e.g., 174) of the substrate (e.g., 132).

Figure 8:
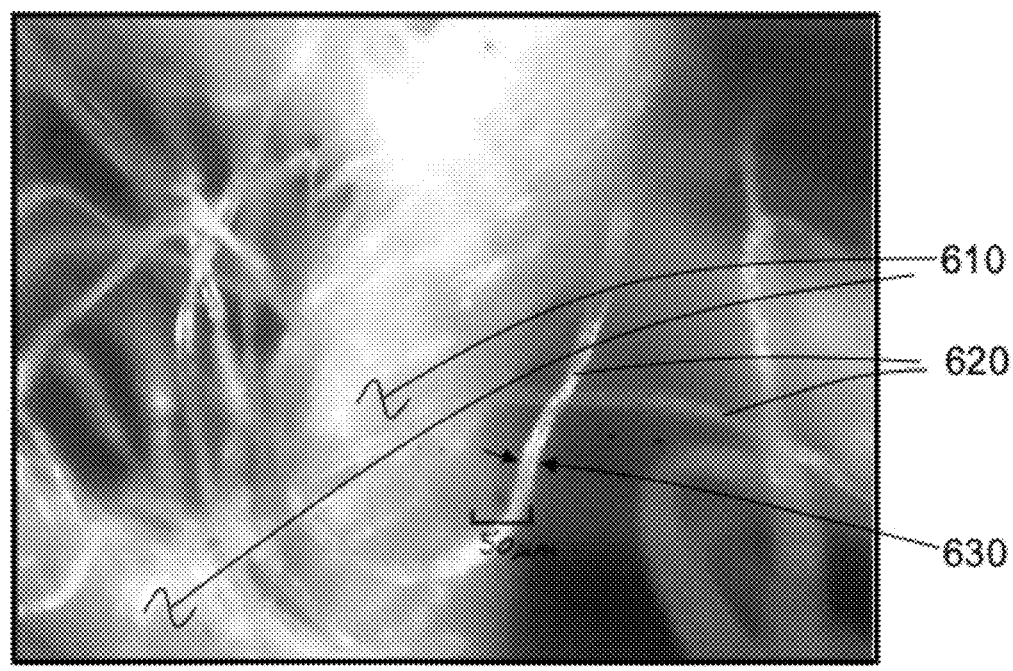
FIG. 8 is a micrograph of strands of yarn and fibers in a cheesecloth.
Figure 9:
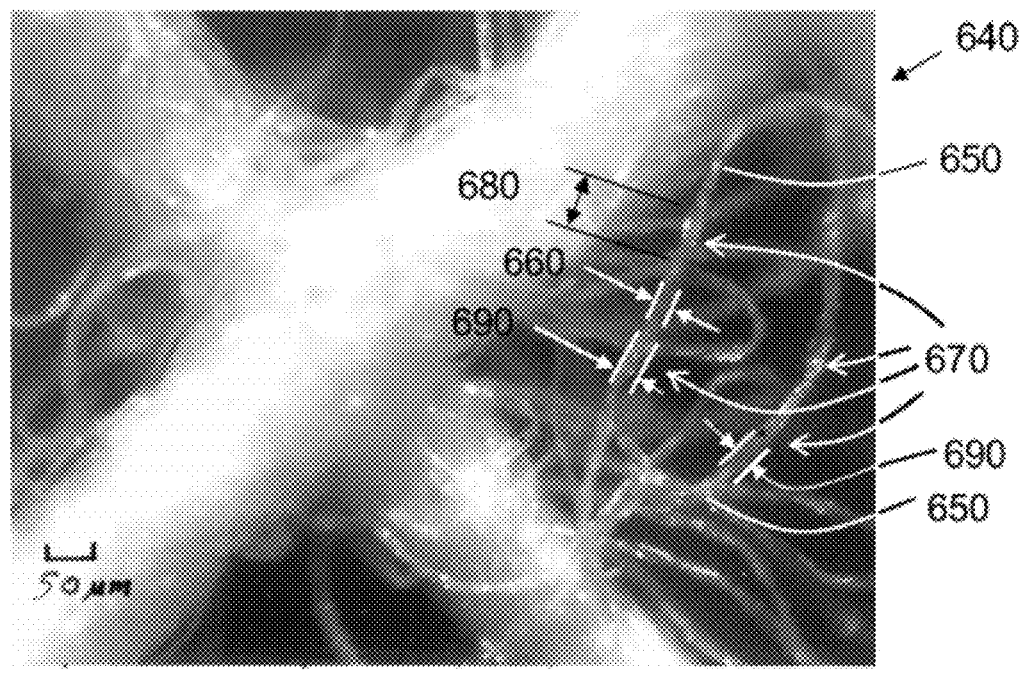
FIG. 9 is a micrograph of strands of yarn and fibers in a cheesecloth treated with polyisobutylene.

FIG. 8 illustrates a magnified view of strands of cheesecloth yarn 610 and individual fibers 620. The individual fibers 620 are ribbon-like structures having substantially uniform, smooth surfaces. The fibers have a nominal width 630 of approximately 25 µm. FIG. 9 illustrates a cleaning medium 640 where treated fibers 650 have polyisobutylene disposed adjacent to the surface of the fibers 650. Over much of the surfaces of the treated fibers 650 the fibers have a treated thickness 660 that is substantially the same as the thickness 630 of (untreated) fibers 620 in FIG. 1, because over much of the surfaces of the treated fibers 650 the polyisobutylene adds a negligible amount to the treated thickness 660 of the treated fibers 650. However in some locations on the treated fibers 650, discrete deposits or droplets 670 of polyisobutylene form on the surface of the treated fibers 650. The droplets 670 have a length 680 that is between approximately one and five times the treated thickness 660 of the treated fibers 650. The droplets 670 have a width 690 that is between approximately 110% and 150% of the treated thickness 660 of the treated fibers 650.

In the embodiments of FIGS. 1B, 2B, 3B, 4A, 4B, 5A, 5B, 6, 7A, 7B, 7C, 8 and 9 the polyisobutylene has a molecular weight of greater than approximately 30,000 and in some embodiments the molecular weight is between approximately 60,000 and 110,000. In some embodiments polyisobutylene may range in molecular weight between approximately 30,000 and 500,000 or between approximately 60,000 and 500,000 or between approximately 100,000 and 500,000. All molecular weights designated herein refer to viscosity average molecular weights (MvA) as determined by gel permeation chromatography. In some embodiments the polyisobutylene may range in molecular weight between approximately 30,000 and 1,000,000 or between approximately 60,000 and 1,000,000 or between approximately 100,000 and 1,000,000. Molecular weight 500,000 polyisobutylene is tacky, and molecular weight 1,000,000 polyisobutylene is slightly tacky. A molecular weight of approximately 85,000 is an exemplary embodiment. Polyisobutylene in all molecular weights defined in this paragraph will dissolve in hexane.

However, a wide variety of aliphatic, cycloaliphatic, or terpene solvents may be used to dissolve the polyisobutylene. As just previously noted, hexane may be used but it is extremely flammable. Although it is quite flammable, dipentene (a particular terpene and a general form of turpentine) may also be used particularly if provided in a pure form. Impure forms tend to be sticky. Dipentene gives the cleaning medium a lemon-like fragrance. Aliphatic hydrocarbons containing more than 11 carbons may be used. For example a diesel fuel distillation fraction of petroleum may be used, although any higher molecular weight solvent such as this requires more energy to evaporate it from the substrate. Chlorinated solvents may be used but are generally less desirable than many others because they are regulated because of their potential for depletion of the earth's ozone layer, and they are typically quite expensive.

A commercial solvent, "142 Solvent 66/3," available from CITGO Petroleum Corporation, is a suitable choice for use in dissolving polyisobutylene because it is fairly environmentally benign, it does not have any serious transportation restrictions, it is non-photo-chemically reactive, it is considered combustible but not "flammable", and its disposal is not problematic under RCRA (the Resource Conservation and Recovery Act, at 42 U.S.C. 6921-6939e). Further, this solvent has been hydrotreated to eliminate olefins and aromatics, making it less reactive and more benign health-wise. According to the Material Safety Data Sheet (MSDS), 142 Solvent 66/3 has the constituents identified in Table 1.

TABLE 1

| Component | Form | Percentage |
| --- | --- | --- |
| C10 Alkanes and Isoparaffins | Mixture | 40-60 |
| C11 Alkanes and Isoparaffins | Mixture | 10-30 |
| C9 Naphthenes | Mixture | 10-15 |
| Nonane, all isomers | Mixture | 1-10 |
| C12 Alkanes and Isoparaffins | Mixture | 0-5 |

Figure 10:
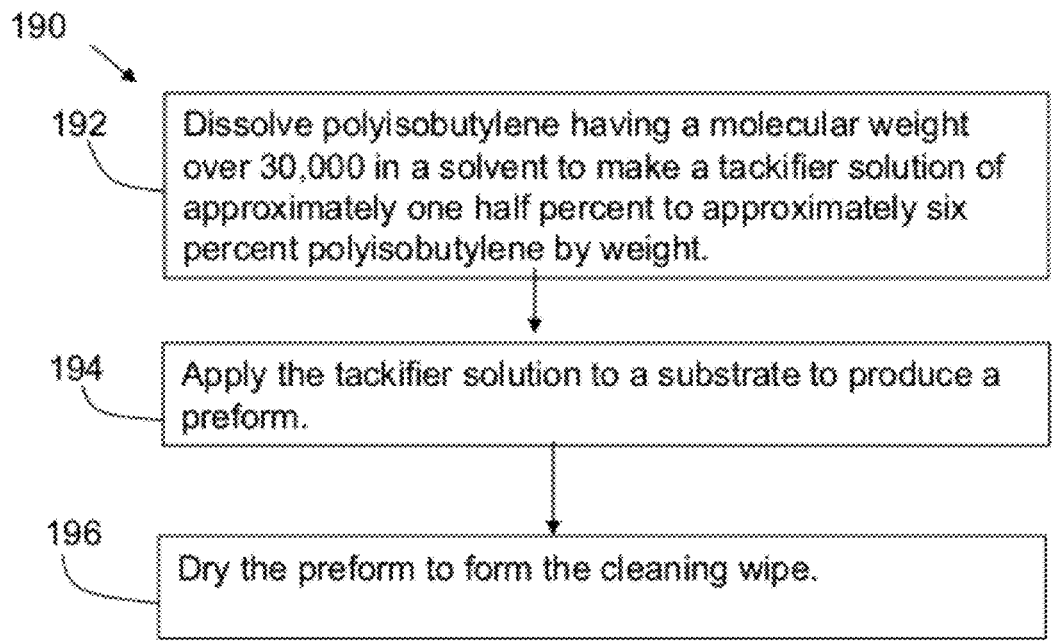
FIG. 10 is a flow chart describing a method of manufacturing a cleaning medium according to certain embodiments disclosed herein.

Various methods may be employed to manufacture a cleaning medium. FIG. 10 presents a flow chart 190 describing steps of one process embodiment. In step 192 polyisobutylene having a molecular weight over 30,000 is dissolved in a solvent, such as 142 Solvent 66/3, to make a tackifier solution of approximately one half percent to approximately six percent polyisobutylene by weight. Various sub-ranges of the proportion of polyisobutylene may be employed, such as (a) approximately one half percent to approximately one and one half percent polyisobutylene by weight, or (b) approximately one and one half percent to approximately two and one half percent polyisobutylene by weight, or (c) approximately two percent to approximately three percent polyisobutylene by weight, or (d) approximately three percent to approximately six percent polyisobutylene by weight.

In some embodiments up to 25 wt % PIB may be dissolved in a solvent. Such solutions are typically quite viscous. Even higher percentages may be dissolved, but the resultant solution is typically much too tacky and smear residue becomes a serious problem for most applications. The 1-10 wt % range typically works well. Cleaning media with approximately 9 wt % work well for removal of heavy contamination where leaving zero residue on a surface is not critical. Such cleaning media smear only slightly and are generally very effective in removing all the contamination from a surface.

In some embodiments, a more precise range of molecular weight of polyisobutylene may be used in step 192, such as polyisobutylene having a molecular weight between approximately 60,000 and 110,000. In some embodiments polyisobutylene may range in molecular weight between approximately 30,000 and 500,000 or between approximately 60,000 and 500,000 or between approximately 100,000 and 500,000. In some embodiments the polyisobutylene may range in molecular weight between approximately 30,000 and 1,000,000 or between approximately 60,000 and 1,000,000 or between approximately 100,000 and 1,000,000.

In step 194 the tackifier solution is applied to a substrate to produce a preform. For configurations in which the polyisobutylene is distributed substantially uniformly through the bulk mass of the substrate, such as the polyisobutylene 72 in FIG. 4B, the tackifier solution may be applied to a substrate by soaking the substrate in the tackifier solution and removing, such as by wringing, excess tackifier solution from the substrate. For configurations in which polyisobutylene is adjacent to the surface of a substrate, such as the polyisobutylene 22 in FIG. 4A, the polyisobutylene may be deposited on the front surface 56 of the substrate 52 by spraying, rolling, brushing, or dipping the front surface 56 in the solution, or using other manufacturing techniques to apply the tackifier solution to the substrate (e.g., 52). For configurations in which polyisobutylene is disposed on the surface of a substrate, such as the polyisobutylene 118 in FIG. 6, the polyisobutylene may be deposited on the front surface 108 of the substrate 102 by spraying, rolling, brushing, or using other manufacturing techniques to apply the tackifier solution to the substrate (e.g., 102). The position of the polyisobutylene on the substrate as a result of such manufacturing processes is generally primarily influenced by the characteristics of the particular substrate.

Continuing with FIG. 10, in step 196 the preform is dried to form the cleaning medium. Drying may be accomplished by leaving the preform in open air until substantially all of the solvent evaporates. Six days of open air drying of a preform having a thin layer of polyisobutylene resulted in the polyisobutylene retaining 112+/1 85 ppm solvent (at a 95% confidence level). Drying may be accelerated or any residual solvent may be removed by using a heat source, or a partial vacuum or forced air circulation over or through the preform. For example, substantially all residual solvent in an air-dried preform may typically be removed by heating the substrate to approximately 90° C. for about ten minutes. Solvent that is removed from the preform during drying may be recovered and recycled.

In some embodiments a cleaning medium may retain at least a minimum detectable amount of solvent. The retention of a small amount of solvent, ranging from a minimum detectable amount (where a minimum detectable amount is defined herein as an amount that is detectable at a 95% confidence level using gas chromatography/mass spectrometry–selected ion monitoring) up to approximately one thousand ppm (weight ratio of solvent to solvent plus polyisobutylene), may provide evidence for a user, such as by fragrance, that a substrate has been treated. Retention of a quantity of the solvent at a fraction greater than the one thousand ppm level may leave an unacceptable amount of solvent on a treated surface or in a treated fluid. Retention of a quantity of the solvent at a fraction under approximately two hundred ppm may be beneficial in order to reduce the potential for leaving an unacceptable amount of solvent on a treated surface or in a treated fluid.

The total weight of a cleaning medium, according to some embodiments described herein, is divided substantially between the weight of the substrate and the weight of the polyisobutylene retained after tackifier solution treatment and drying. Typically, in applications where polyisobutylene is disposed through a depth of a substrate, about ninety nine and one half percent to about ninety four percent of the weight of the portion of the medium that is permeated by the polyisobutylene is the weight of the substrate that is permeated by the polyisobutylene, and the balance of the weight in the portion of the substrate permeated by the polyisobutylene is the permeated polyisobutylene.

Typically, where cheesecloth is used as the substrate, a cleaning medium has approximately 3 wt % PIB on 97 wt % cheese cloth. This formulation does not produce a discernible smear residue when the cleaning medium is used to clean a surface. A range of approximately 1 to 10 wt % PIB (99 to 90 wt % cloth) works for cleaning media, but near the 10% end of the range the cleaning medium starts to smear a bit. The appropriate weight range changes with the fiber density of the substrate. Cheese cloth is rather open and requires less PIB. A dense felt substrate may have more surface area to cover with PIB, hence it will typically require a higher wt % PIB to provide a desired level of contamination removal. In some embodiments the substrate has a front surface and has fibers on the front surface and the relative weight ratio between the polyisobutylene and the fibers is between approximately 1 to 10 wt % polyisobutylene to approximately 90 to 99 wt % fibers.

In applications where polyisobutylene is disposed only on or only adjacent to the surface of the substrate, the weight percentage of the polyisobutylene is compared to a "reference portion" of the bulk mass of the substrate. That is, the substrate has a thickness and the bulk mass of the substrate has a reference portion. The reference portion of the bulk mass is a portion of the substrate to a depth of approximately the first one hundred to one thousand micrometers of the thickness of the substrate. If the thickness of the substrate is less than the indicated "first distance" of the thickness of the substrate, then the term the first distance (e.g. the term "the first one thousand micrometers" or "the first one hundred micrometers") of the thickness of the substrate refers to the thickness of the substrate. The polyisobutylene has a weight and the reference portion of the bulk mass has a weight, and the weight of the polyisobutylene is generally approximately one half percent to six percent of the combined weight of the polyisobutylene and the weight of the reference portion of the bulk mass. References to the comparative weights of components of a cleaning medium typically excludes peripheral materials that may be added to the medium for consumer appeal but that do not assist in the cleaning function of the medium. Examples of such peripheral materials are moisture (water) or fragrances or other volatile compounds that are added to provide such features as a pleasant aroma and suppleness of the cleaning medium in its consumer packaging. The "dry weight" of a cleaning medium (and its weight distribution) refers to the weight of the cleaning medium measured after such peripheral materials are evaporated from the medium. Other ancillary materials that do not contribute to cleaning function may be incorporated into the cleaning media. Examples of such ancillary materials are dyes used to color the substrate and inks used to inscribe logos or other markings. Such ancillary materials obviously add some finite measurable weight to the dry weight of a cleaning medium, but the weight of such materials is not considered to be part of the substantial weight of the medium.

The total weight of a cleaning medium, according to some embodiments described herein, is divided almost solely between the weight of the substrate and the weight of the polyisobutylene retained after tackifier solution treatment and drying. In such embodiments, the cleaning medium has a total dry weight that includes a substrate. If the substrate is porous it typically has a bulk mass with a plurality of voids and the porous substrate embodies a percentage of the total dry weight of the cleaning medium. This leaves a remaining percentage of dry weight of polyisobutylene that is disposed within a least a portion of the plurality of voids. For example in these embodiments, if the substrate is substantially ninety percent of the dry weight of the cleaning medium, the polyisobutylene is substantially ten percent of the dry weight of the cleaning medium, and except for ancillary components of the type previously described, the cleaning medium includes no other component. Typically the substrate embodies between approximately six percent and ninety four percent of the total dry weight of the cleaning medium In some instances the substrate may be very thick and/or dense, such as a wool pad. In such instances when the weight of the cleaning medium is divided almost solely between the weight of the substrate and the weight of the polyisobutylene, the substrate may, for example, embody from approximately ninety four percent to ninety nine and one half percent of the dry weight of cleaning medium and the polyisobutylene will embody the remaining percent. In some instances the substrate may be very thin, such as a plastic film or a fine fabric, and in such embodiments the substrate may, for example, embody from approximately one half percent to six percent of the dry weight of the cleaning medium. Other embodiments between those limits are also feasible. In exemplary embodiments the polyisobutylene embodies less than approximately twenty percent of the dry weight of the cleaning medium.

Typically, cleaning media prepared as disclosed herein are designed to be used dry, without any liquid cleaning agent. Heavily contaminated surfaces may be wiped first with a utility medium and a surface cleaner such as Formula 409® and allowed to dry. The dry surface is then wiped with a surface of the cleaning medium at which polyisobutylene is disposed. Vigorous wiping may be used in applications where contamination is difficult to remove. In embodiments where the cleaning medium is used as a fluid filter, the fluid is typically a gas. In cases where the fluid is a liquid or comprises a vapor, the liquid or vapor generally comprises a chemical, such as a solvent, that somewhat softens the polyisobutylene in order for the polyisobutylene to better pick up particulates in the liquid stream.

Example One

Manufacturing operations that involve beryllium have very stringent limits on the amount of beryllium contamination that may remain on the surface of a part that is released to the public. Ideally, such parts would have no detectable amounts of beryllium, but typically a level of 0.2 μg/100 cm$^2$ is considered acceptable as a "release-to-public" specification. Instrumentation is available to detect beryllium contamination at very low concentrations (typically (0.01 μg/100 cm$^2$), and getting to "non-detect" levels is extremely difficult. Once a surface had been contaminated, it typically is very difficult to remove contamination below 0.040 μg/100 cm$^2$, and achieving that level using prior art methods generally results in the generation of a considerable amount of beryllium-contaminated paper waste.

To address this problem several test cleaning wipes were prepared and tested. The first type of cleaning wipe (Cloth No. 1) that was prepared and tested used 250 μm (0.010")-thick micro fiber cloths made of random loops of 20 μm-diameter cellulose fiber as the substrate. A second type of cleaning wipe (Cloth No. 2) that was prepared and tested used woven cheesecloth as the substrate. This particular cheesecloth was woven using 50 μm-diameter cotton thread, spaced ~200 μm apart in a very open weave. The third type of cleaning wipe (Cloth No. 3) that was prepared and tested used as the substrate a non-woven, hydro-entangled micro fiber cloth made of densely packed cellulose and polyester fibers, the fibers of each type measuring approximately 20 μm in diameter. These wipes measured 0.33 mm (0.013 in.) thick.

For the purposes of testing, four concentrations of "dry" tackifier were prepared by dissolving 85,000 MW polyisobutylene (PIB) in hexane. Solutions of 1 wt %, 2 wt %, 2.5 wt %, and 5 wt % PIB in hexane were prepared. A number of the first type of cellulose wipes (Cloth No. 1) were soaked in three of the tackifier blends (1%, 2.5%, and 5%), wrung "dry", and then allowed to dry in a laboratory hood. After drying the coated cloths felt dry and non-sticky to the touch. 85,000 MW PIB is a commonly available, solid, elastic form of polyisobutylene that is not excessively sticky to the touch. Lower molecular weights of PIB are available, but these are excessively sticky and flow too readily and therefore leave a sticky residue on the "cleaned surface."

First Series of Tests

Figure 11:
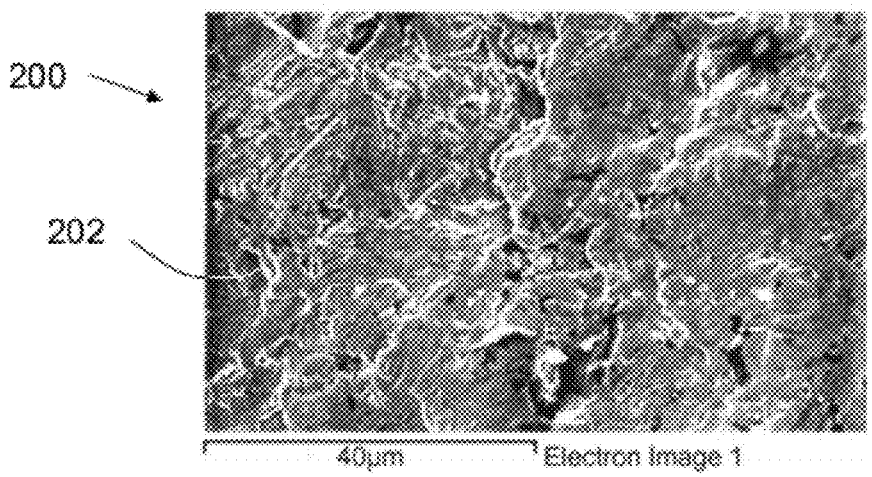
FIG. 11 is a photomicrograph of the surface of a typical stainless steel coupon used to test cleaning media.
Figure 12:
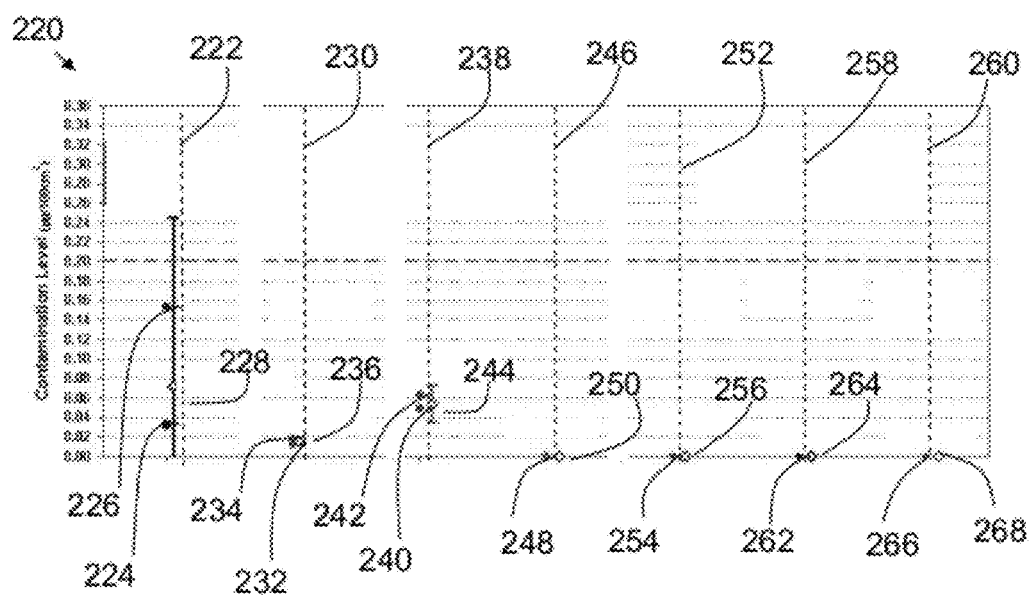
FIGS. 12-15 are plots of test results from particular cleaning wipes.

The effectiveness of these tack cloths was shown in tests conducted on a matte-finished stainless steel can. The roughness of this matte finish was measured to be 1.56+/−0.15 μm. FIG. 11 presents a Scanning Electron Micrograph 200 showing the roughness of the stainless steel surface 202, and FIG. 11 illustrates that the stainless steel surface 202 had a considerable amount of roughness where micron-sized particulate could become lodged. Industrial hygiene test smears were taken on this can that had been stored in a regulated beryllium area for four months. Contamination on three areas of the can averaged 0.0536+/−0.0197 μg/100 cm$^2$ at the 95% confidence level. The can was then wiped with cleaning wipe prepared with 2.5 wt % solution of PIB in hexane. The results of these tests are shown in chart 220 presented in FIG. 12.

First test results 222 represent a reference test using a micro fiber cloth that did not have tackifier treatment. The cleaning was performed under ambient indoor lighting with no special technique employed to visually enhance visual perception of contamination. Results ranged from data point 224 to data point 226 with an average residual contamination after cleaning of 0.0723+/−0.1733 μg/100 cm$^2$ at the 95% confidence level, as depicted by error bar 228. Second test results 230 represent results using utility wipes and Formula 409®. A fluorescent dye made up of fluorescent particles in the 5 μm range was used to simulate BeO particulate, since this contaminant is invisible to the naked eye. The fluorescent dye gave visual confirmation of removal of the particulate or of the effectiveness of the cleaning process. Subsequent testing of resultant cleanliness produced two test result data points 232 and 234 with average residual contamination of 0.0138+/−0.0090 μg/100 cm$^2$ at the 95% confidence level, as depicted by error bar 236. The test can was then put in storage for four months and retested, producing test results 238. Results ranged from data point 240 to 242 with average residual contamination of 0.0536+/−0.0197 μg/100 cm$^2$ at the 95% confidence level, as depicted by error bar 244.

In a further test, an area of the can was wiped with Cloth No. 1 made with a 2.5 wt % solution of PIB. The test results 246 were three "non-detect" data points 248 with a "0" error bar 250. Following this test, the can was deliberately contaminated with a heavy amount of fine beryllium oxide powder. Visible powder was removed in a superficial manner with a utility wipe and Formula 409®. Once dry, the contaminated surface was thoroughly wiped with the cellulose micro fiber tack cloth (Cloth No. 1) made with 5 wt % solution of PIB in hexane. Industrial hygiene test smears were once again made of the three contaminated-and-cleaned regions yielding test results 252. The three trials resulted in three "non-detects" as indicated by data points 254 and "0" error bar 256.

The contamination, cleaning, and the industrial hygiene test smear process was repeated two more times using the micro fiber tack cloth (Cloth No. 1) made first with a 2.5% solution of PIB and then a 1% solution of PIB. These test results 258 and 260 show three "non-detect" data points 262 with a "0" error bar 264 and three more "non-detect" data points 266 with a "0" error bar 268.

Figure 13:
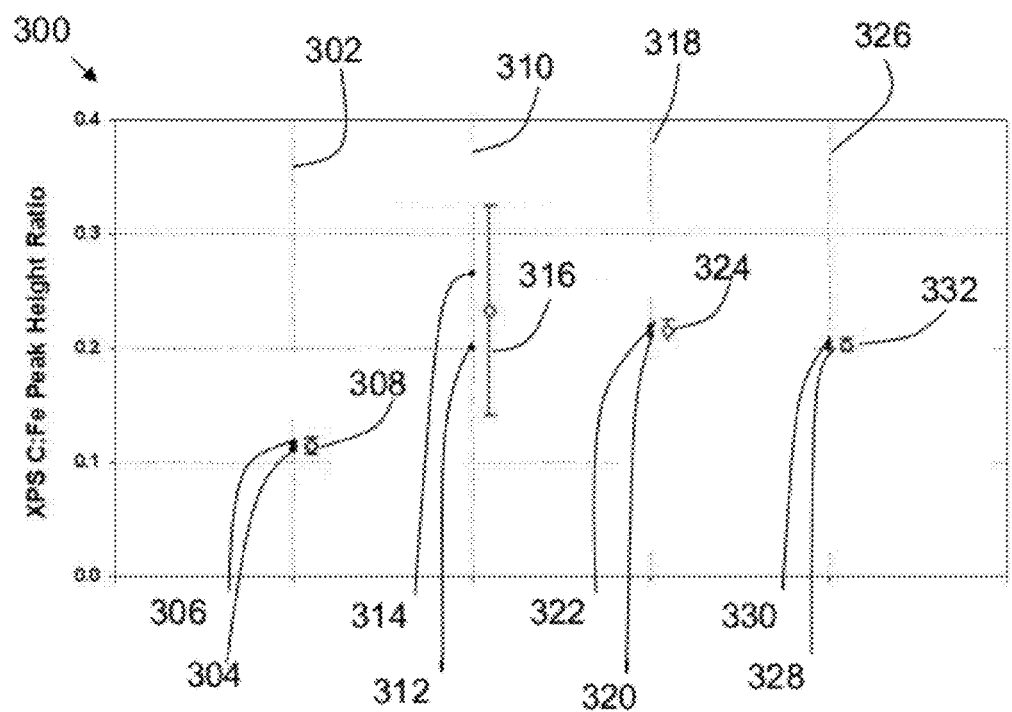

After determining the levels of beryllium oxide left on the matte finish of a stainless steel can, clean specimens of stainless steel were smeared with two of the lower levels of tackifier on two micro fiber cloths, those made with the 1 wt % and 2.5 wt % solutions of PIB in hexane. The purpose of this testing was to measure any residual PIB or other material that might be transferred from a cleaning wipe to a cleaned surface. For comparison purposes, a third steel specimen was vigorously wiped using a utility wipe and an industrial solvent, and a fourth stainless steel specimen was cleaned using an aggressive 20 kHz ultrasonic probe in 10% nitric acid with a small amount of hydrogen peroxide. This latter surface cleaning process represents an ultra level of cleaning, not ordinarily obtainable by wiping. The nitric acid and hydrogen peroxide chemically burns off any organic residue, while the ultrasonic probe provides a very aggressive mechanical cleaning. After smearing the steel coupons as just described the steel specimens were then analyzed using X-ray Photoelectron Spectroscopy or XPS to determine what kind of residue was left behind by the reference processes and the PIB cleaning wipes. XPS is a very sensitive test that is capable of detecting even partial mono-layers of residues left on surfaces. FIG. 13 shows the XPS results 300. Relative cleanliness is indicated by a residual carbon-to-iron XPS ratio.

FIG. 13 reveals that ultrasonic acid cleaning produced the cleanest surfaces as indicated by test results 302 where results ranged between data point 304 and data point 306, with a ratio of 0.114+−0.030 at a 95% confidence level, indicated by error bar 308. Wiping with the industrial solvent and a utility wipe left a rather broad range of carbonaceous (solvent) residue as indicated by test results 310. Results ranged from data points 312 to 314 with a ratio of 0.233+−0.391 at a 95% confidence level, as indicated by error bar 316. Wiping with the 1% and 2.5% polyisobutylene cleaning wipes left a very narrow range of residue. Test results 318 for the 1% cleaning wipe ranged from data point 320 to 322 with a ratio of 0.214+−0.042 at a 95% confidence level, as depicted by error bar 324. Test results 326 for the 2.5% polyisobutylene cleaning wipes ranged from data point 328 to 330 with a ratio of 0.202+−0.024 as indicated by error bar 332. Both error bars 324 and 332 were tighter than the error bar 316 for solvent wiping, and both fell within the range of the error bar 316 for solvent cleaning.

Second Series of Tests

Several sheets of commercial cotton cheese cloth (Cloth No. 2) measuring 0.25 mm in thickness and 85 cm×85 cm in area, and each weighing 29 g, were soaked in a 2 wt % solution of 85,000 MW polyisobutylene (PIB) in hexane. These cloths were wrung "dry" and then hung to dry in a lab hood. The dry weights of the coated cloths indicated that they had gained 3.3 wt % in PIB. After coating, the cloths felt dry to the touch and were not sticky.

Figure 14:
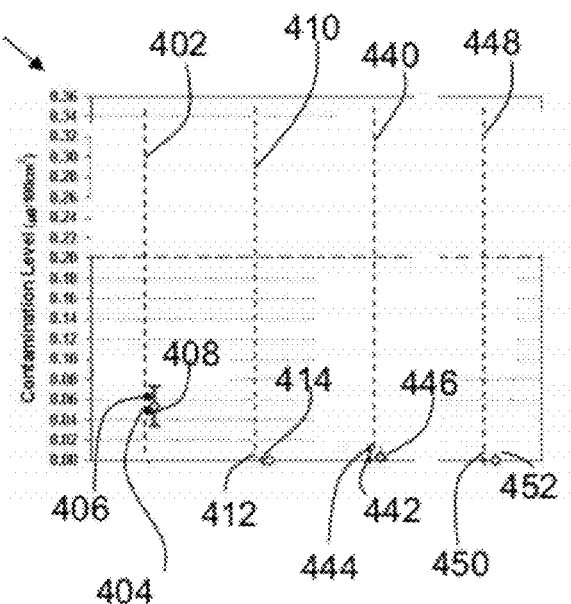

The matte-finish stainless steel can was once again deliberately contaminated with a heavy amount of fine beryllium oxide powder. The excess contamination was wiped off in a superficial manner using Formula 409® surface cleaner and paper utility wipes. Final cleaning was done by wiping with the treated dry cheese cloths. Industrial hygiene test smears were made of the three contaminated-and-cleaned stainless steel surfaces. Test chart 400 in FIG. 14 shows the results of this cleaning, along with additional results of wiping with various other polyisobutylene cleaning wipes. Test results 402 represent initial contamination levels before cleaning Results ranged from data point 404 to data point 406, with average contamination at 0.0536+/−0.0197 µg/100 cm$^2$ at the 95% confidence level as depicted by error bar 408. Test results 410 were for the 2.0% cheese cloth (Cloth No. 2), and three "non-detect" data points 412 yielding "0" error bar 414.

Third Series of Tests

The third type of wipe that was treated and tested (Cloth No. 3) was a non-woven, hydro-entangled micro fiber cloth made of densely packed cellulose and polyester fibers, the fibers of each type measuring approximately 20 µm in diameter. These wipes measured approximately 0.33 mm (0.013 in.) thick and approximately 12"×12" in area. Groups of ten wipes were rolled together and soaked in a 2 wt % solution of 85,000 molecular weight polyisobutylene in hexane. After soaking, the wipes were wrung "dry" of solvent, then allowed to dry in a chemical fume hood. The average gain in weight for three groups of ten wipes averaged 3.7+/−0.7 wt % (+/−1 standard deviation).

Returning to FIG. 14, test results 440 were for Cloth No. 3 with 2.5 wt % tackifier solution, showing and 2 "non-detect" data points 442 and 1 detect data point 444 at 0.0120, which is just above the detection limit. The two "non-detects" and the one detect data point resulted in error bar 446.

A final test was run to determine how effectively the tackified polyester/cellulose cloths (Cloth No. 3) could clean heavily contaminated surfaces. The surface of the stainless steel can was once again heavily contaminated with beryllium oxide powder. This time the surface was only lightly damp-wiped to protect the investigator from air-borne contamination. Once this surface was dry, it was thoroughly wiped with a tackified polyester/cellulose cloth (Cloth No. 3) treated with 2 wt % tackifier solution. Test results 448 show three "non-detect" data points 450 yielding "0" error bar 452.

In summary, in 20 out of 21 tests involving tackified cloths made according to this disclosure, all but one (i.e., 95% of the tests) resulted in residual contamination below the limits of detection for beryllium. The only "detect" value was only 2% above the limit of detection for beryllium and may lie within the error band for experimental scatter.

Fourth Series of Tests

Figure 15:
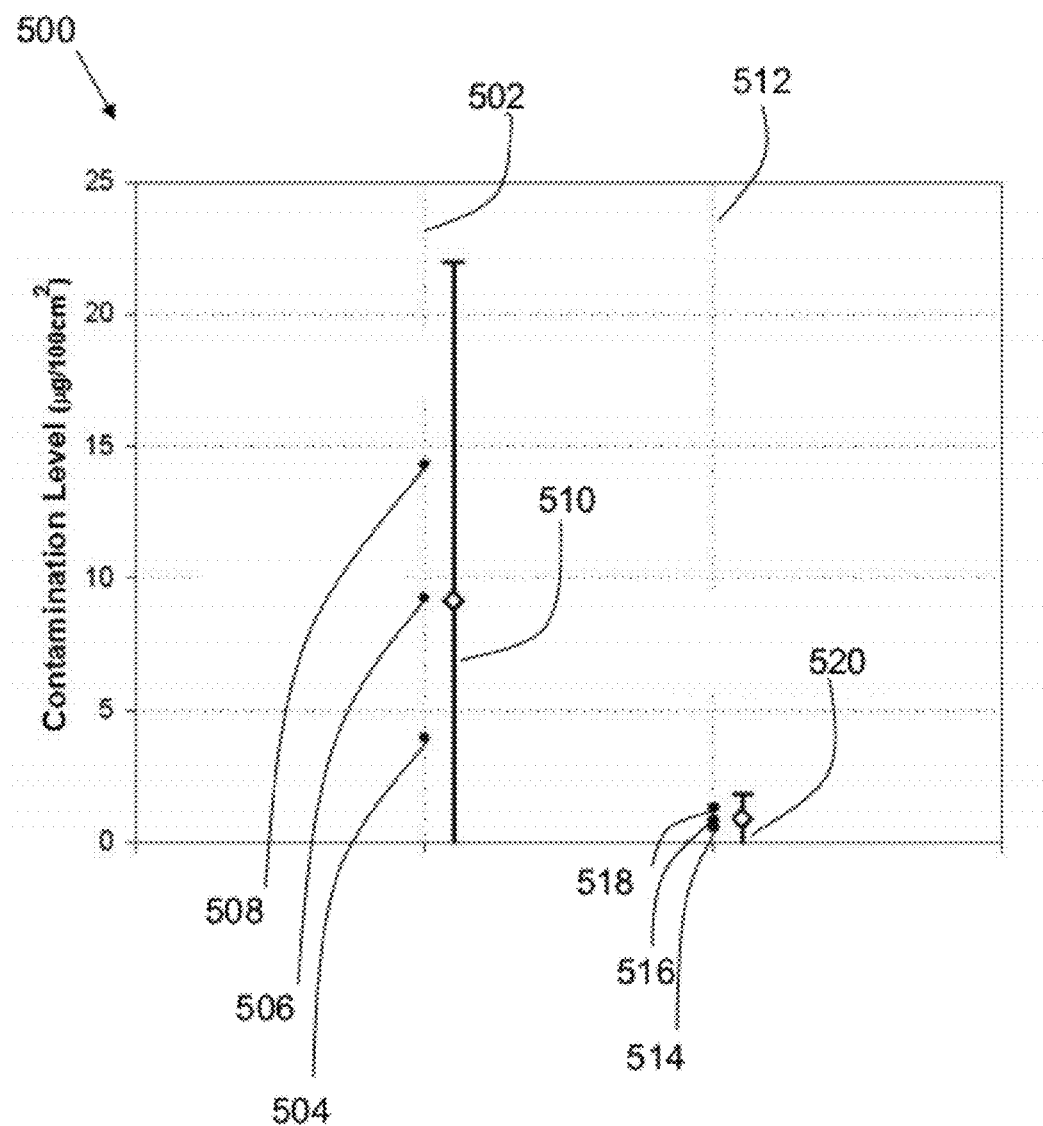

Monolithic specimens of BeO that are hot-pressed using lithium oxide as a sintering aid are notorious for shedding BeO particulate matter. Reducing the level of removable BeO particulate on the surfaces of hot-pressed BeO is very difficult. In order to test the effectiveness of the PIB tackified cleaning wipes, the cellulose cloth (Cloth No. 1) was impregnated with a 2.5 wt % solution of 85,000 MW PIB in hexane and allowed to dry. Three monolithic specimens of hot-pressed BeO were vigorously washed using Formula 409™ surface cleaner and a stiff polymer scrub brush under flowing water. All surfaces were thoroughly dried, and Industrial Hygiene test smears were taken of the dry surfaces. Chart 500 of FIG. 15 shows test results 502. Data points 504, 506, and 508 are widely scattered and average 9.16+/−12.83 µg/100 cm2 (+/−95% confidence) as indicated by error bar 510. The dry surfaces were then wiped with the tack cloth (Cloth No. 1) made with a solution of 2.5% PIB, and industrial hygiene test smears were once again taken and the test results 512 for three trials shown by data points 514, 516, and 518 show that wiping with the PIB tack cloth reduced the contamination by an order of magnitude to 0.91+/−0.92 µg/100 cm2, and also resulted in a significantly reduced error bar 520.

Example Two

Several P100 respirator cartridges were soaked in a 3 wt % polyisobutylene tackifier solution and dried in an air exhaust hood. An untreated cartridge was installed on one side of a respirator and a second treated cartridge on the other side. The respirator was then used in a wood-working shop to evaluate the performance of the treated versus untreated cartridges.

Fifth Series of Tests

Figure 16:
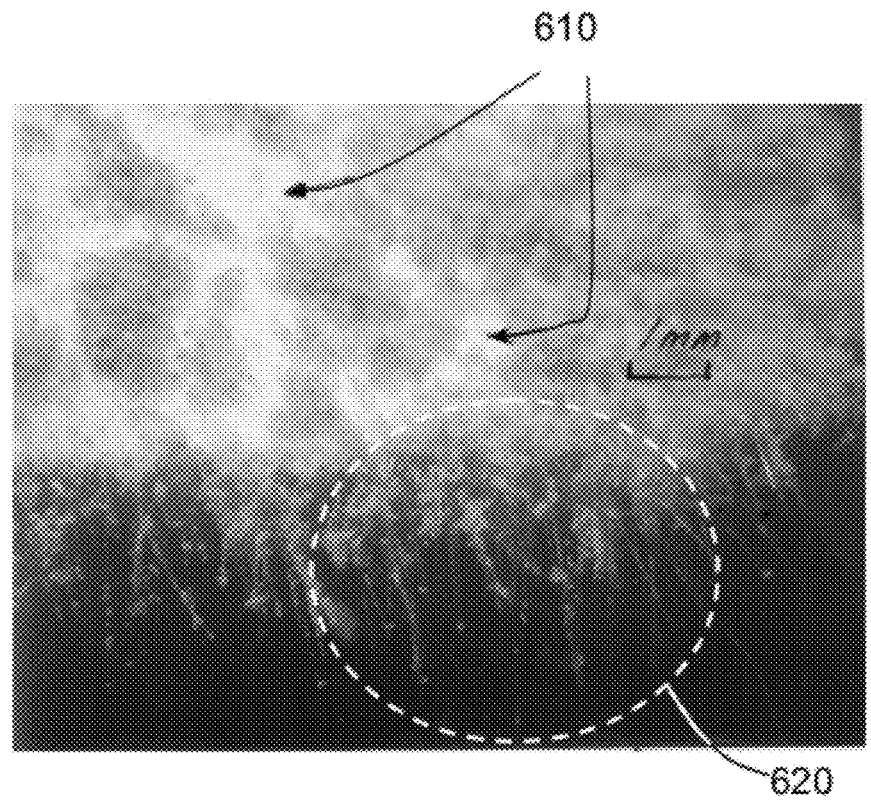
FIGS. 16, 18, and 20 are progressively increased magnification photomicrographs of fibers in an untreated respirator cartridge after exposure to a moderately dusty environment.
Figure 17:
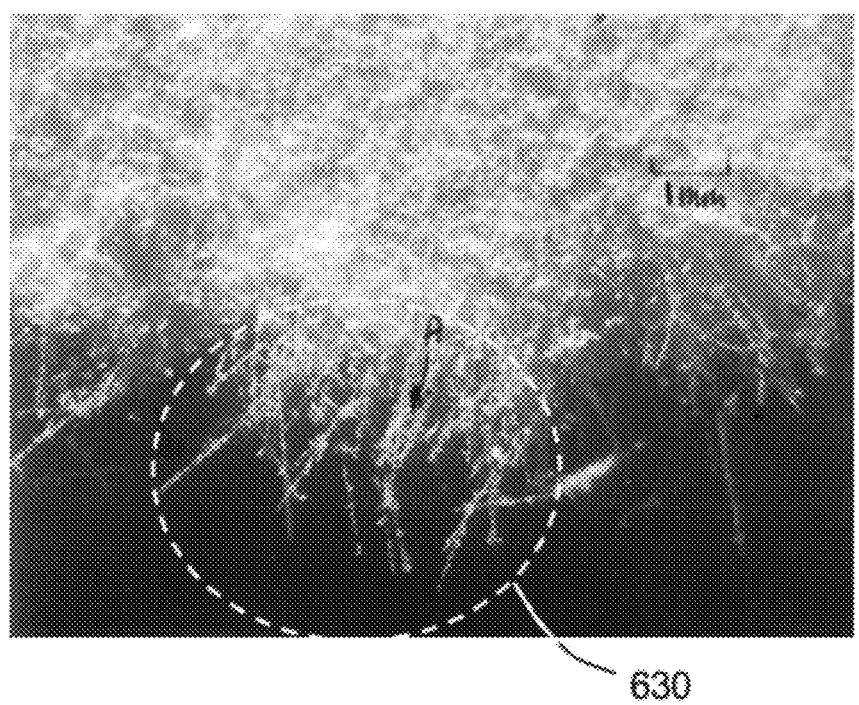
FIGS. 17, 19, and 21 are progressively increased magnification photomicrographs of fibers in a polyisobutylene-treated respirator cartridge after exposure to a moderately dusty environment.
Figure 18:
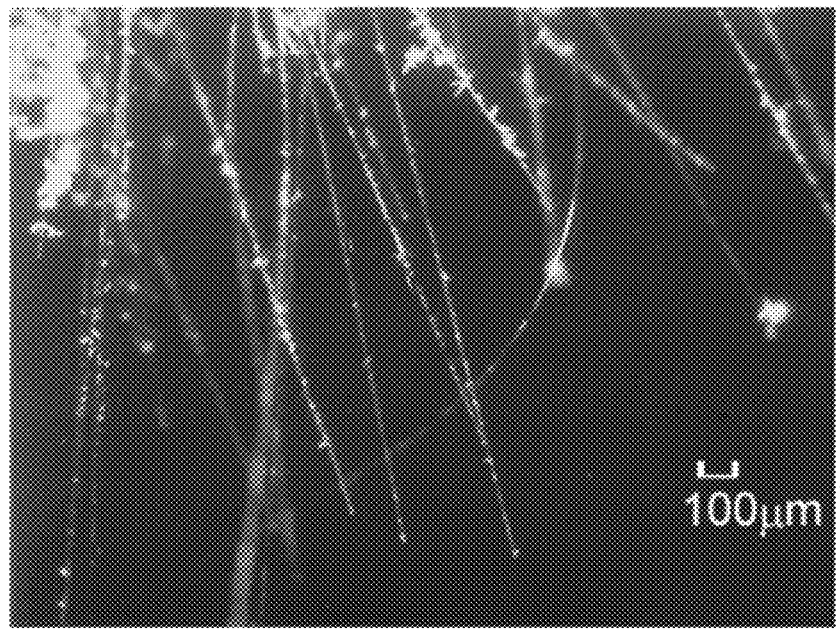
Figure 19:
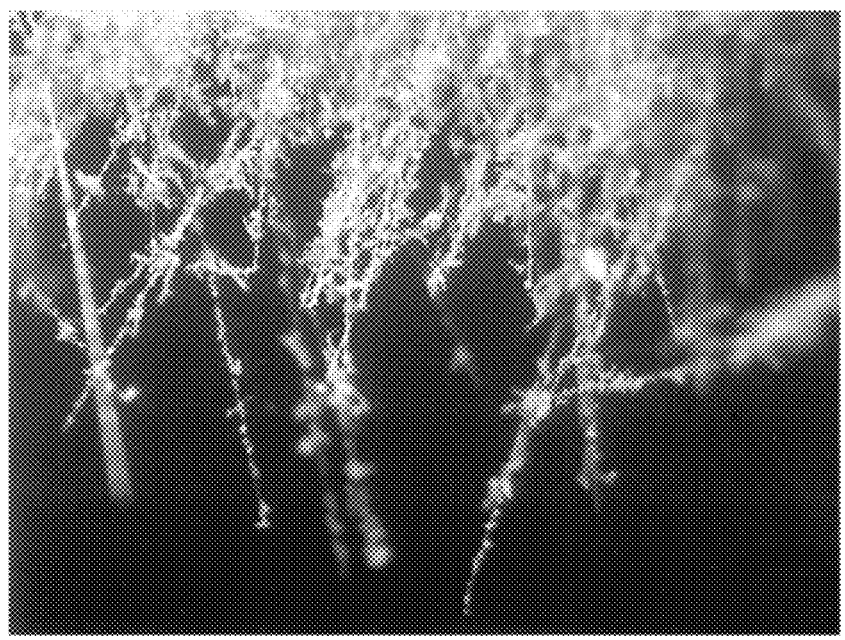
Figure 20:
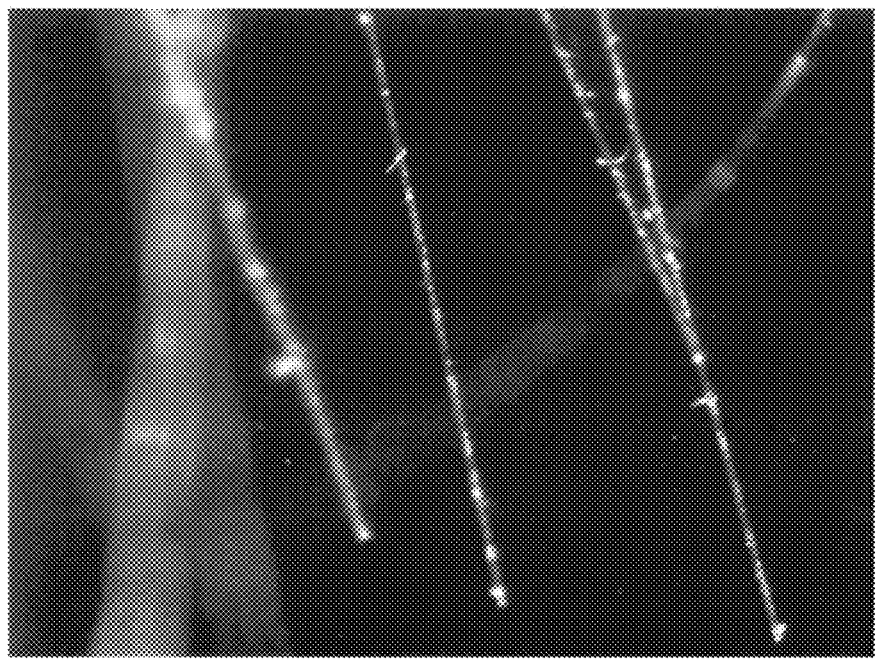
Figure 21:
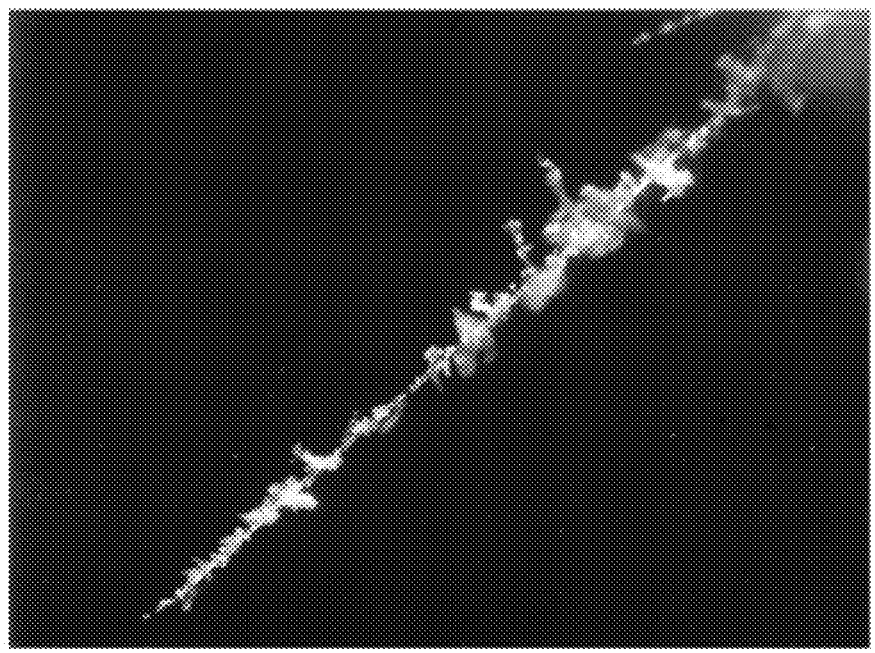

The respirator was worn for approximately one hour in a moderately dusty wood work-shop environment. The cartridges were then opened and a section of the filter paper in each cartridge was torn away for inspection. FIG. 16 is a magnified view of a portion of the surface of the filter paper in the untreated cartridge and FIG. 17 is a magnified view of a portion of the surface of the filter paper in the treated cartridge. In FIG. 16, substantially bare spots 610 are observed where, as the result of the test and inspection process, the untreated filter released portions of trapped particulate contaminants. The treated paper (FIG. 17) more effectively retained the trapped particles. FIG. 18 is a further magnification of a portion of area 620 of FIG. 16 and FIG. 19 is a further magnification of a portion of area 630 in FIG. 17. The filter fibers in FIG. 19 (the treated cartridge) have more particulate material adhering to their surfaces than do the filter fibers of FIG. 18 (the un-treated cartridge). This conclusion is further indicated by FIGS. 20 and 21 where FIG. 20 is a further magnification of several individual fibers from the untreated cartridge and FIG. 21 is a further magnification of several individual fibers from the treated cartridge.

Sixth Series of Tests

Figure 22:
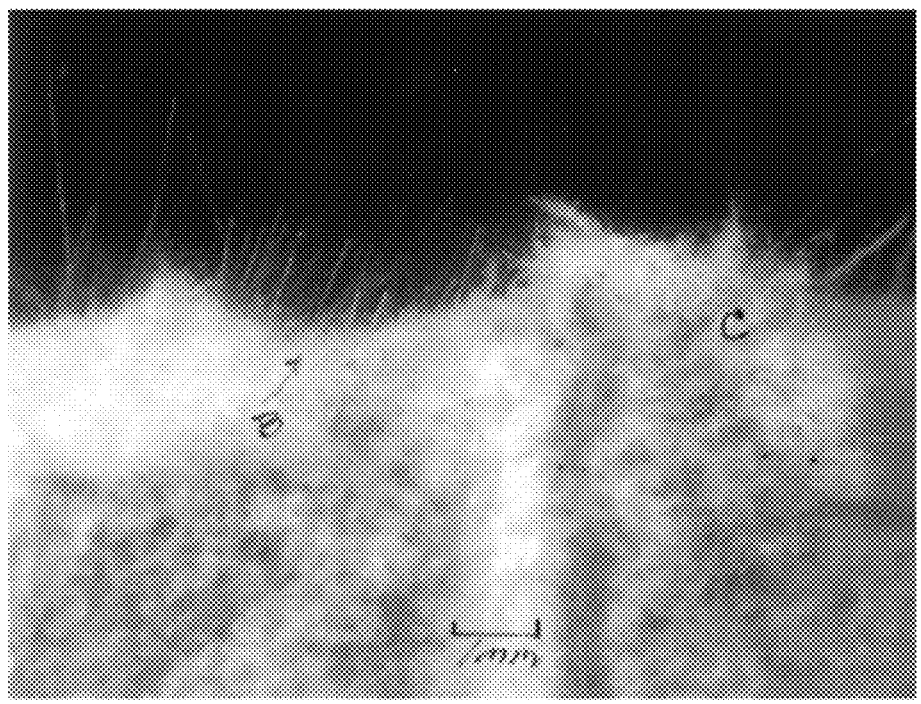
FIGS. 22, 24, and 26 are progressively increased magnification photomicrographs of fibers in an untreated respirator cartridge after exposure to a highly dusty environment.
Figure 23:
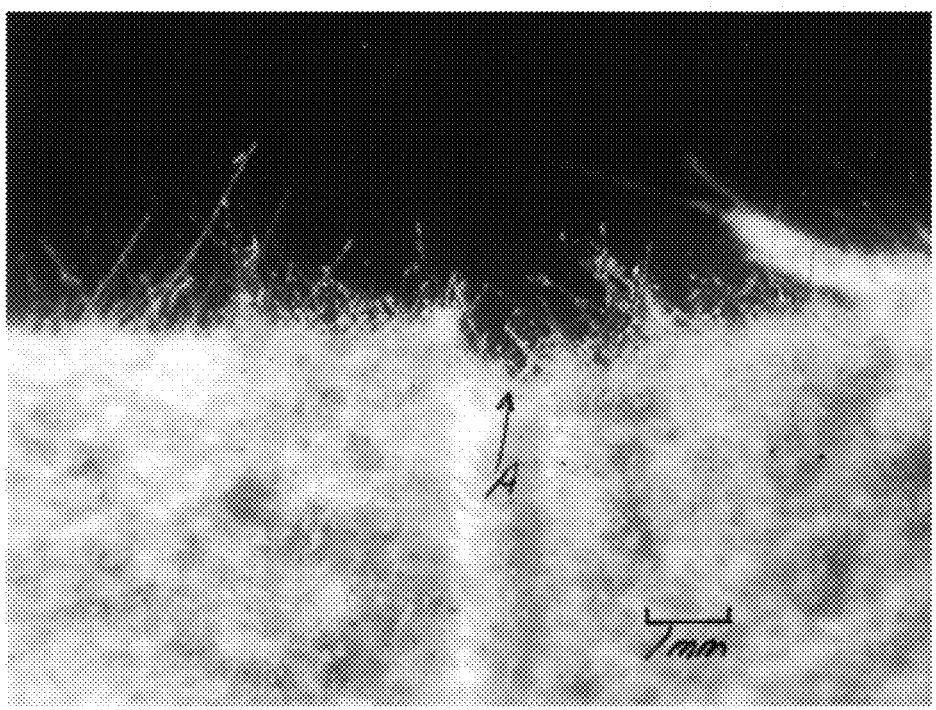
FIGS. 23, 25, and 27 are progressively increased magnification photomicrographs of fibers in a polyisobutylene-treated respirator cartridge after exposure to a highly dusty environment.
Figure 24:
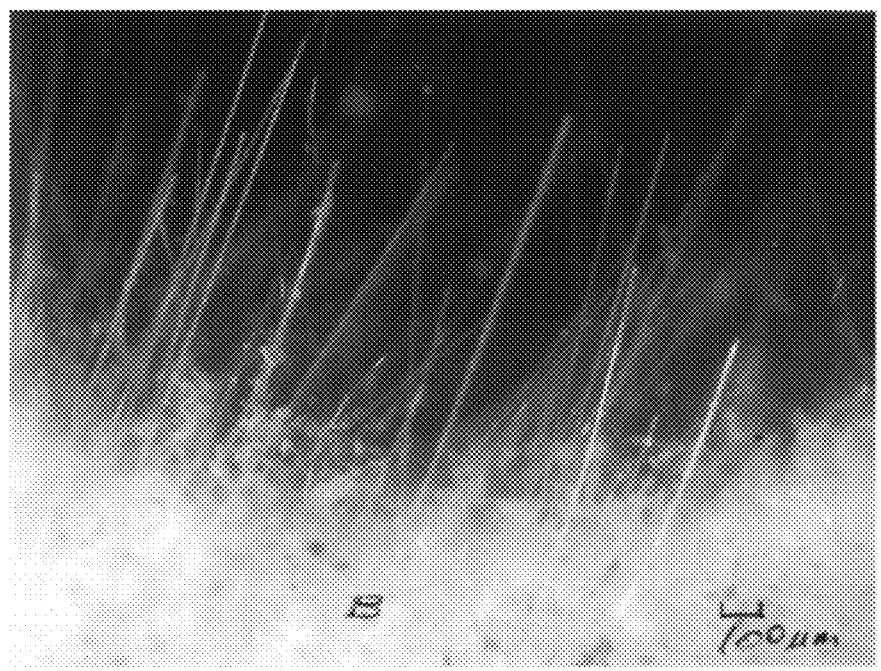
Figure 25:
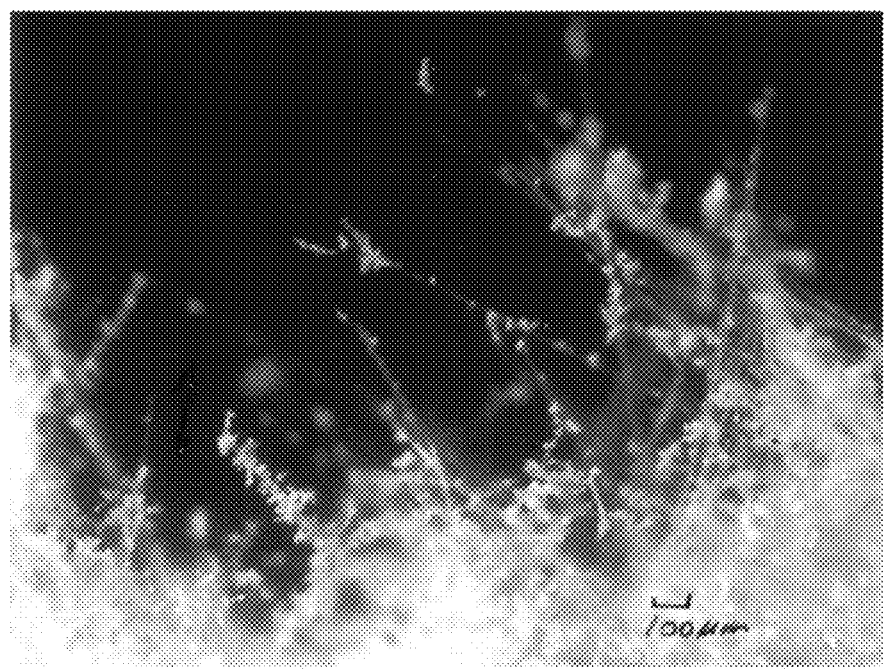
Figure 26:
Figure 27:
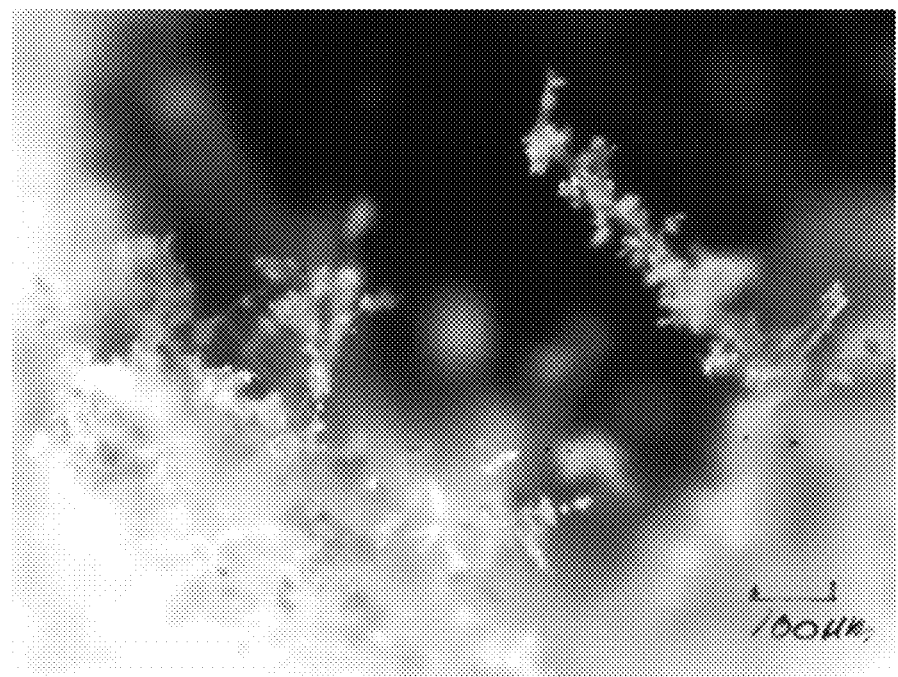

A Second set of cartridges, one treated and the other untreated, were installed on the same respirator. This time the respirator was worn while a surface planer in the wood-working shop was run for nearly an hour. That operation generated an enormous amount of airborne sawdust. The cartridges were then opened and a section of the filter paper in each cartridge was torn away for inspection. FIG. 22 is a magnified view of a portion of the surface of the filter paper in the untreated cartridge and FIG. 23 is a magnified view of a portion of the surface of the filter paper in the treated cartridge. While the difference in bulk particulate retention between the treated and untreated cartridges is not as dramatic in the high-dust environment as in the moderately dusty environment, the treated cartridge (FIG. 23) did a better job than the untreated cartridge (FIG. 22) in retaining trapped particles. FIGS. 24 and 26 (untreated fibers) and FIGS. 25 and 27 (treated fibers) illustrate that fibers in the treated cartridge retained more particulates on their surfaces than did fibers in the untreated cartridges.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of the principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A method for removing beryllium contamination from a surface to a level of less than about 0.04 µg beryllium/100 cm$^2$ of surface area, the method comprising:
   (a) dissolving a polyisobutylene to form a tackifier solution of approximately 0.5 wt % to approximately 10 wt % polyisobutylene;
   (b) applying the tackifier solution to a substrate to produce a preform;
   (c) drying the preform to form a dry cleaning wipe; and
   (d) wiping the surface with the dry cleaning wipe to remove the beryllium contamination wherein the beryllium contamination is removed from the surface to a level of less than about 0.04 µg beryllium/100 cm$^2$ of surface area.

2. The method of claim 1 wherein step (d) comprises wiping the surface with the dry cleaning wipe without any liquid cleaning agent.

3. The method of claim 1 for removing beryllium contamination from a surface wherein step (a) comprises dissolving the polyisobutylene in a solvent to form a tackifier solution of approximately 0.5 wt % to approximately 1.5 wt % polyisobutylene.

4. The method of claim 1 for removing beryllium contamination from a surface wherein step (a) comprises dissolving the polyisobutylene in a solvent to form a tackifier solution of approximately 1.5 wt % to approximately 2 wt % polyisobutylene.

5. The method of claim 1 for removing beryllium contamination from a surface wherein step (a) comprises dissolving the polyisobutylene in a solvent to form a tackifier solution of approximately 2 wt % to approximately 3 wt % polyisobutylene.

6. The method of claim 1 for removing beryllium contamination from a surface wherein step (a) comprises dissolving the polyisobutylene in a solvent to form a tackifier solution of approximately 4 wt % to approximately 6 wt % polyisobutylene.

7. The method of claim 1 for removing beryllium contamination from a surface wherein step (a) comprises dissolving polyisobutylene having a viscosity average molecular weight ($M_{VA}$) over 30,000 in a solvent to form a tackifier solution of approximately 0.5 wt % to approximately 10 wt % polyisobutylene.

8. The method of claim 1 for removing beryllium contamination from a surface wherein step (a) comprises dissolving polyisobutylene having a viscosity average molecular weight ($M_{VA}$) between approximately 30,000 and 1,000,000 in a solvent to form a tackifier solution of approximately 0.5 wt % to approximately 10 wt % polyisobutylene.

9. The method of claim 1 for removing beryllium contamination from a surface wherein no significant residue from the dry cleaning wipe is detectable after step (d), as indicated by a carbon-to-iron X-ray Photoelectron Spectroscopy residual carbon-to-iron ratio of less than about 0.25 on stainless steel.

10. A method for removing beryllium contamination from a surface to a level of less than about 0.04 µg beryllium/100 cm$^2$ of surface area, the method comprising wiping the surface with a cleaning wipe consisting substantially of a porous substrate having a plurality of voids and polyisobutylene disposed within at least a portion of the plurality of voids.

11. The method of claim 10 for removing beryllium contamination from a surface wherein no significant residue from the cleaning wipe is detectable after removing the beryllium contamination, as indicated by a carbon-to-iron X-ray Photoelectron Spectroscopy residual carbon-to-iron ratio of less than about 0.25 on stainless steel.

\* \* \* \* \*